US012639529B2

(12) United States Patent
Yuan et al.

(10) Patent No.: US 12,639,529 B2
(45) Date of Patent: May 26, 2026

(54) ENHANCING LARGE LANGUAGE MODELS USING IN-CONTEXT LEARNING AND ONLINE KNOWLEDGE

(71) Applicant: International Business Machines Corporation, Armonk, NY (US)

(72) Inventors: Zhong Fang Yuan, Xi'an (CN); Tong Liu, Xi'an (CN); Shi Bo Yan, Xi'an (CN); Lin Feng, Beijing (CN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 182 days.

(21) Appl. No.: 18/509,678

(22) Filed: Nov. 15, 2023

(65) Prior Publication Data

US 2025/0156653 A1     May 15, 2025

(51) Int. Cl.
*G06F 40/40*          (2020.01)
*G06F 16/334*          (2025.01)
*G06F 40/30*          (2020.01)

(52) U.S. Cl.
CPC .......... *G06F 40/40* (2020.01); *G06F 16/3347* (2019.01); *G06F 40/30* (2020.01)

(58) Field of Classification Search
CPC ....... G06F 40/40; G06F 16/3347; G06F 40/30
See application file for complete search history.

(56) References Cited

U.S. PATENT DOCUMENTS

2015/0186504 A1     7/2015   Gorman et al.
2015/0293899 A1 *  10/2015   Baughman .............. G06F 40/30
                                          704/9

2017/0308620 A1 *  10/2017   Cao .......................... G06F 16/13
2018/0039696 A1 *   2/2018   Zhai ..................... G06F 16/9024
2018/0246952 A1 *   8/2018   Ye ........................... G06N 5/048
2020/0073933 A1 *   3/2020   Zhao ..................... G06F 40/117

(Continued)

FOREIGN PATENT DOCUMENTS

CN         110941722 B      7/2022
IN      202311014575 A      3/2023

OTHER PUBLICATIONS

Gao, T., Yao, X., & Chen, D. (2021). Simcse: Simple contrastive learning of sentence embeddings. arXiv preprint arXiv:2104.08821. (Year: 2021).*

(Continued)

*Primary Examiner* — Bhavesh M Mehta
*Assistant Examiner* — Philip H Lam
(74) *Attorney, Agent, or Firm* — Amin, Turocy & Watson, LLP

(57)                ABSTRACT

One or more systems, devices, computer program products and/or computer-implemented methods of use provided herein relate to enhancing LLMs using in-context learning and online knowledge. The computer-implemented system can comprise a memory that can store computer executable components. The computer-implemented system can further comprise a processor that can execute the computer executable components stored in the memory, wherein the computer executable components can comprise a semantic retrieval component that can extract information from an online source, according to a query, to generate an in-context learning input utilized by an LLM for responding to the query.

20 Claims, 10 Drawing Sheets

(56)            References Cited

U.S. PATENT DOCUMENTS

| | | | | |
|---|---|---|---|---|
| 2020/0302311 | A1 | 9/2020 | Scheutz et al. | |
| 2020/0334282 | A1* | 10/2020 | Dasgupta | G06F 16/906 |
| 2023/0297855 | A1* | 9/2023 | Hoang | G06N 3/042 |
| | | | | 706/52 |
| 2025/0005057 | A1* | 1/2025 | Khosla | G06F 40/40 |
| 2025/0111192 | A1* | 4/2025 | Bayless | G06N 3/006 |
| 2025/0147937 | A1* | 5/2025 | Tsai | G06F 16/258 |

OTHER PUBLICATIONS

Sun, J., Xu, C., Tang, L., Wang, S., Lin, C., Gong, Y., . . . & Guo, J. (2023). Think-on-graph: Deep and responsible reasoning of large language model on knowledge graph. arXiv preprint arXiv:2307. 07697. (Year: 2023).*
Pan, S., Zheng, Y., & Liu, Y. (2023). Integrating Graphs with Large Language Models: Methods and Prospects. arXiv preprint arXiv: 2310.05499. (Year: 2023).*
Andriopoulos, K., & Pouwelse, J. (2023). Augmenting LLMs with Knowledge: A survey on hallucination prevention. arXiv preprint arXiv:2309.16459. (Year: 2023).*

Bergvall, P. (2023). Reducing LLM Hallucinations in Product Q&A Systems: A Retrieval-Augmented Generation Approach. (Year: 2023).*
Harrer. "Attention is Not All You Need: The Complicated Case of Ethically Using Large Language Models in Healthcare and Medicine" Digital Health Cooperative Research Centre, Melbourne, Australia. eBioMedicine 2023;90: 104512 Published Online Mar. 15, 2023 https://doi.org/10.1016/j.ebiom.2023.104512 (12 pages.).
Weidinger et al., "Ethical and Social Risks of Harm from Language Models" DeepMind. arXiv:2112.04359v1 [cs.CL] Dec. 8, 2021.
"In Context Learning (ICL)" Hopsworks. Web accessed Nov. 8, 2023. https://www.hopsworks.ai/dictionary/in-context-learning-icl#:~:text=Context%20Learning%20(ICL)-,What%20is%20In% 20Context%20Learning%20(ICL)%3F,prompt%20(in%20natural% 20language).
"What is retrieval-augmented generation?" IBM. Web accessed Nov. 8, 2023. https://research.ibm.com/blog/retrieval-augmented-generation-RAG.
Biddle Sam, "The Internet's New Favorite AI Proposes Torturing Iranians and Surveilling Mosques", The Intercept, Voices, Dec. 8, 2022, 5 Pages.
No Author. "Temporary policy: ChatGPT", Reverse Engineering Meta, Feb. 2023, 4 Pages.

* cited by examiner

FIG. 3

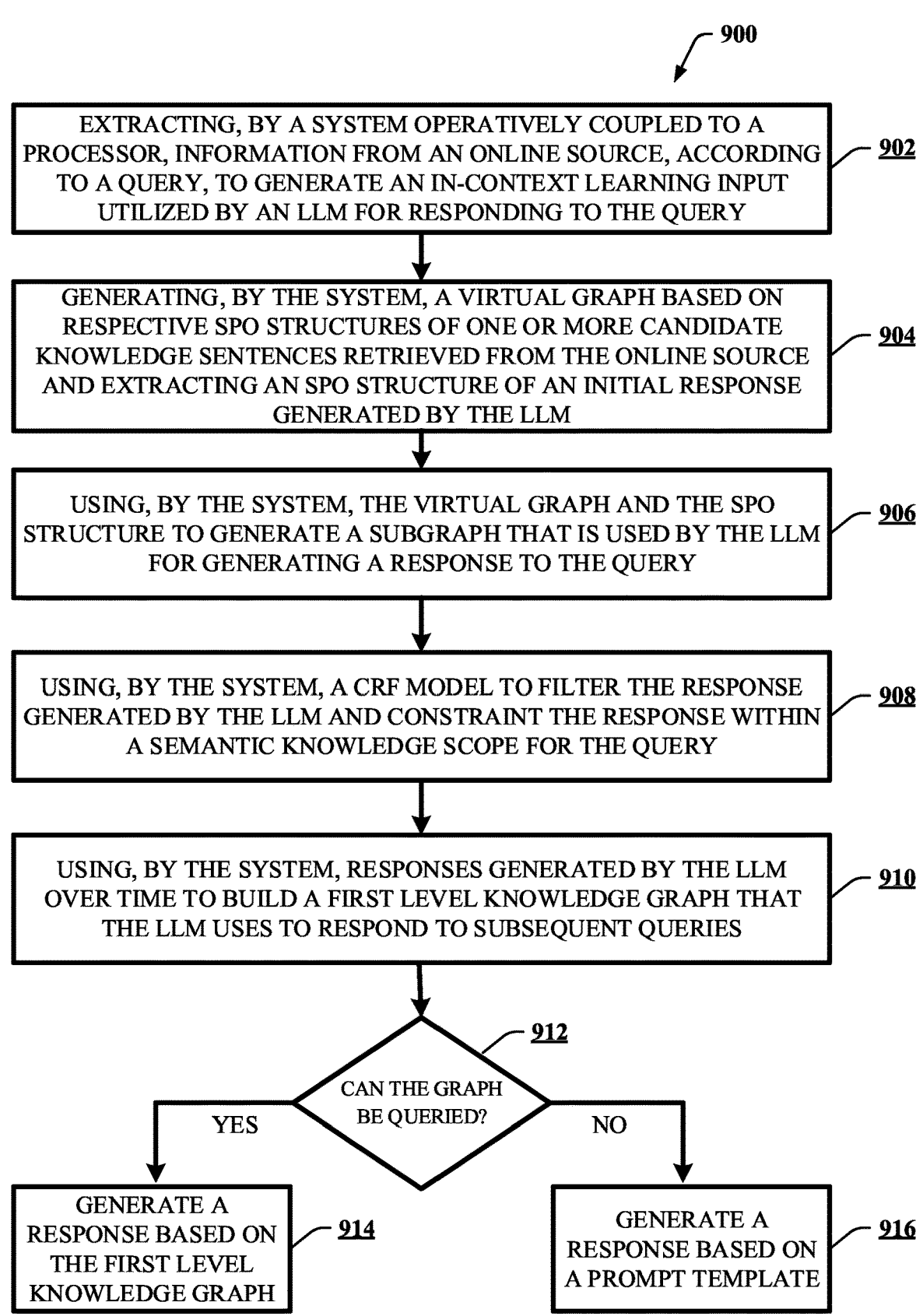

900

EXTRACTING, BY A SYSTEM OPERATIVELY COUPLED TO A PROCESSOR, INFORMATION FROM AN ONLINE SOURCE, ACCORDING TO A QUERY, TO GENERATE AN IN-CONTEXT LEARNING INPUT UTILIZED BY AN LLM FOR RESPONDING TO THE QUERY — 902

GENERATING, BY THE SYSTEM, A VIRTUAL GRAPH BASED ON RESPECTIVE SPO STRUCTURES OF ONE OR MORE CANDIDATE KNOWLEDGE SENTENCES RETRIEVED FROM THE ONLINE SOURCE AND EXTRACTING AN SPO STRUCTURE OF AN INITIAL RESPONSE GENERATED BY THE LLM — 904

USING, BY THE SYSTEM, THE VIRTUAL GRAPH AND THE SPO STRUCTURE TO GENERATE A SUBGRAPH THAT IS USED BY THE LLM FOR GENERATING A RESPONSE TO THE QUERY — 906

USING, BY THE SYSTEM, A CRF MODEL TO FILTER THE RESPONSE GENERATED BY THE LLM AND CONSTRAINT THE RESPONSE WITHIN A SEMANTIC KNOWLEDGE SCOPE FOR THE QUERY — 908

USING, BY THE SYSTEM, RESPONSES GENERATED BY THE LLM OVER TIME TO BUILD A FIRST LEVEL KNOWLEDGE GRAPH THAT THE LLM USES TO RESPOND TO SUBSEQUENT QUERIES — 910

912
CAN THE GRAPH BE QUERIED?
YES                        NO

GENERATE A RESPONSE BASED ON THE FIRST LEVEL KNOWLEDGE GRAPH — 914

GENERATE A RESPONSE BASED ON A PROMPT TEMPLATE — 916

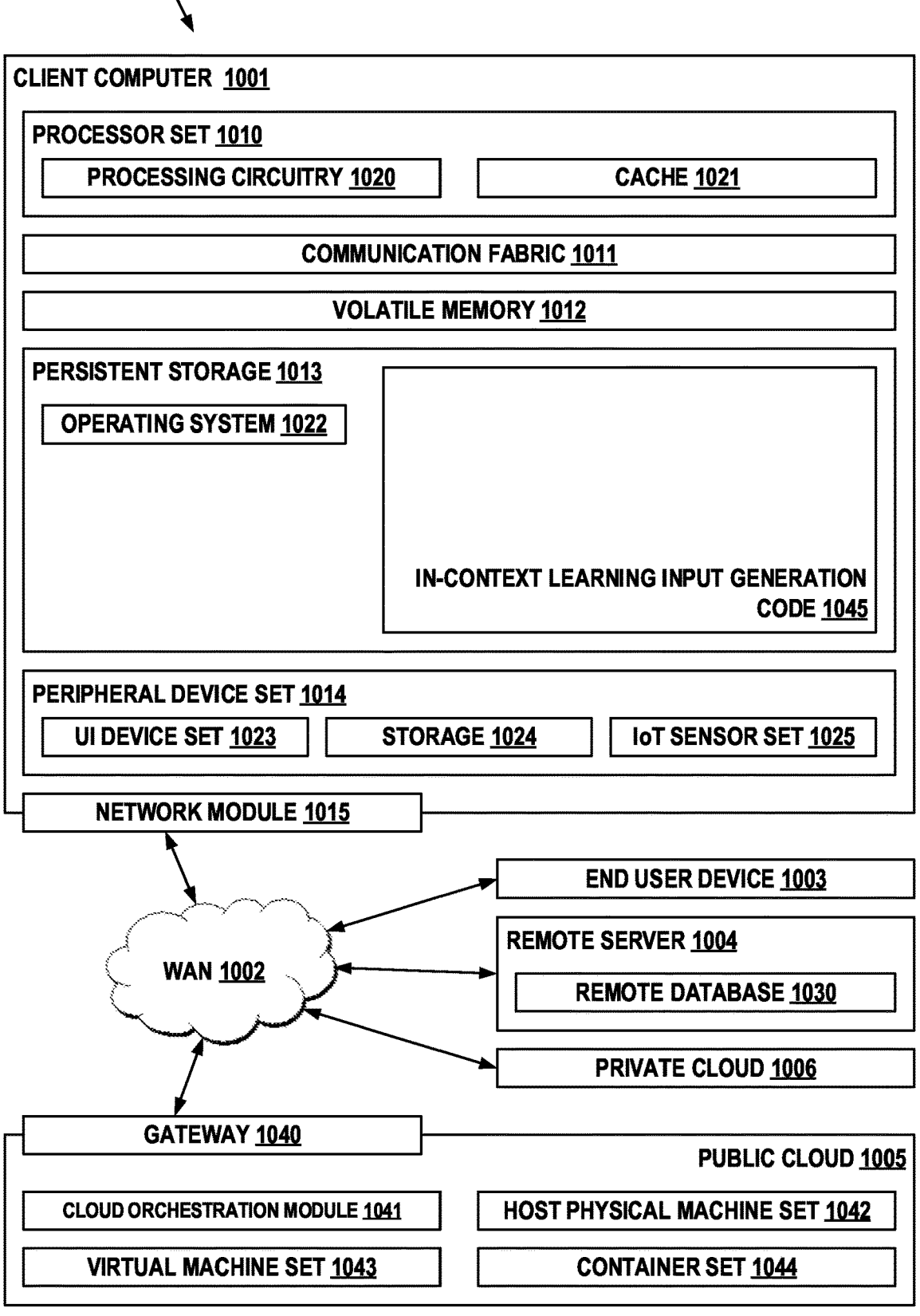

CLIENT COMPUTER 1001

PROCESSOR SET 1010

PROCESSING CIRCUITRY 1020

CACHE 1021

COMMUNICATION FABRIC 1011

VOLATILE MEMORY 1012

PERSISTENT STORAGE 1013

OPERATING SYSTEM 1022

IN-CONTEXT LEARNING INPUT GENERATION CODE 1045

PERIPHERAL DEVICE SET 1014

UI DEVICE SET 1023

STORAGE 1024

IoT SENSOR SET 1025

NETWORK MODULE 1015

WAN 1002

END USER DEVICE 1003

REMOTE SERVER 1004

REMOTE DATABASE 1030

PRIVATE CLOUD 1006

GATEWAY 1040

PUBLIC CLOUD 1005

CLOUD ORCHESTRATION MODULE 1041

HOST PHYSICAL MACHINE SET 1042

VIRTUAL MACHINE SET 1043

CONTAINER SET 1044

FIG. 10

ENHANCING LARGE LANGUAGE MODELS USING IN-CONTEXT LEARNING AND ONLINE KNOWLEDGE

BACKGROUND

The subject disclosure relates to machine learning, and more specifically to enhancing large language models (LLMs) using in-context learning and online knowledge.

In recent years, with continuous development of natural language processing (NLP) technology, LLMs have become a direction of significant research in the field of NLP processing. LLMs can learn and understand large-scale natural language data, thereby greatly improving productivity for individuals. However, training data for LLMs and subjective biases of annotators can cause LLMs to generate biased results. In addition, a generative content of LLMs can be uncontrollable and unexplainable, which can pose ethical and legal risks for applications of LLMs in certain fields.

The above-described background description is merely intended to provide a contextual overview regarding machine learning and LLMs and is not intended to be exhaustive.

SUMMARY

The following presents a summary to provide a basic understanding of one or more embodiments described herein. This summary is not intended to identify key or critical elements, delineate scope of particular embodiments or scope of claims. Its sole purpose is to present concepts in a simplified form as a prelude to the more detailed description that is presented later. In one or more embodiments described herein, systems, computer-implemented methods, apparatus and/or computer program products that enable enhancing LLMs using in-context learning and online knowledge are discussed.

According to an embodiment, a system is provided. The system can comprise a memory that can store computer-executable components. The system can further comprise a processor that can execute the computer-executable components stored in the memory, wherein the computer-executable components can comprise a semantic retrieval component that can extract information from an online source, according to a query, to generate an in-context learning input utilized by an LLM for responding to the query. Such embodiments of the system can provide a number of advantages, including making LLMs more accurate and stable in responding to various natural language tasks and enhancing trustworthiness of responses generated by LLMs.

In one or more embodiments of the aforementioned system, the semantic retrieval component can use Simple Contrastive Learning of Sentence Embeddings (simCSE), tagging and semantic searching to extract the information from the online source. In one or more embodiments of the aforementioned system, an information extraction component can generate a virtual graph based on respective subject-predicate-object (SPO) structures of respective candidate knowledge sentences retrieved by the semantic retrieval component and extract an SPO structure of an initial response generated by the LLM. In an aspect, the information extraction component can use an algorithm to extract the respective SPO structures from the respective candidate knowledge sentences and to extract the SPO structure from the initial response generated by the LLM. In one or more embodiments of the aforementioned system, the semantic retrieval component can use the virtual graph and the SPO structure to generate a subgraph that can be used by the LLM for generating a response to the query. In one or more embodiments of the aforementioned system, a filtering component can use a Conditional Random Field (CRF) model to filter the response generated by the LLM and constraint the response within a semantic knowledge scope for the query. In one or more embodiments of the aforementioned system, responses generated by the LLM over time can be used to build a first level knowledge graph that the LLM can use to respond to subsequent queries. In an aspect, the first level knowledge graph can increase inference efficiency of the LLM above a defined threshold. Such embodiments of the system can provide a number of advantages, including making LLMs more accurate and stable in responding to various natural language tasks, enhancing trustworthiness of responses generated by LLMs, and improving an inferencing efficiency of an LLM.

According to various embodiments, the above-described system can be implemented as a computer-implemented method or as a computer program product.

BRIEF DESCRIPTION OF DRAWINGS

One or more embodiments are described below in the Detailed Description section with reference to the following drawings:

FIG. 3 illustrates another block diagram of an example, non-limiting process that can enhance an LLM using in-context learning combined with online knowledge in accordance with one or more embodiments described herein.

FIG. 9 illustrates a flow diagram of an example, non-limiting method that can enhance an LLM using in-context learning combined with online knowledge in accordance with one or more embodiments described herein.

FIG. 10 illustrates a block diagram of an example, non-limiting operating environment in which one or more embodiments described herein can be facilitated.

DETAILED DESCRIPTION

The following detailed description is merely illustrative and is not intended to limit embodiments and/or application or uses of embodiments. Furthermore, there is no intention to be bound by any expressed or implied information presented in the preceding Background or Summary sections, or in the Detailed Description section.

One or more embodiments are now described with reference to the drawings, wherein like referenced numerals are used to refer to like elements throughout. In the following description, for purposes of explanation, numerous specific details are set forth in order to provide a more thorough understanding of the one or more embodiments. It is evident, however, in various cases, that the one or more embodiments can be practiced without these specific details.

Figure 1:
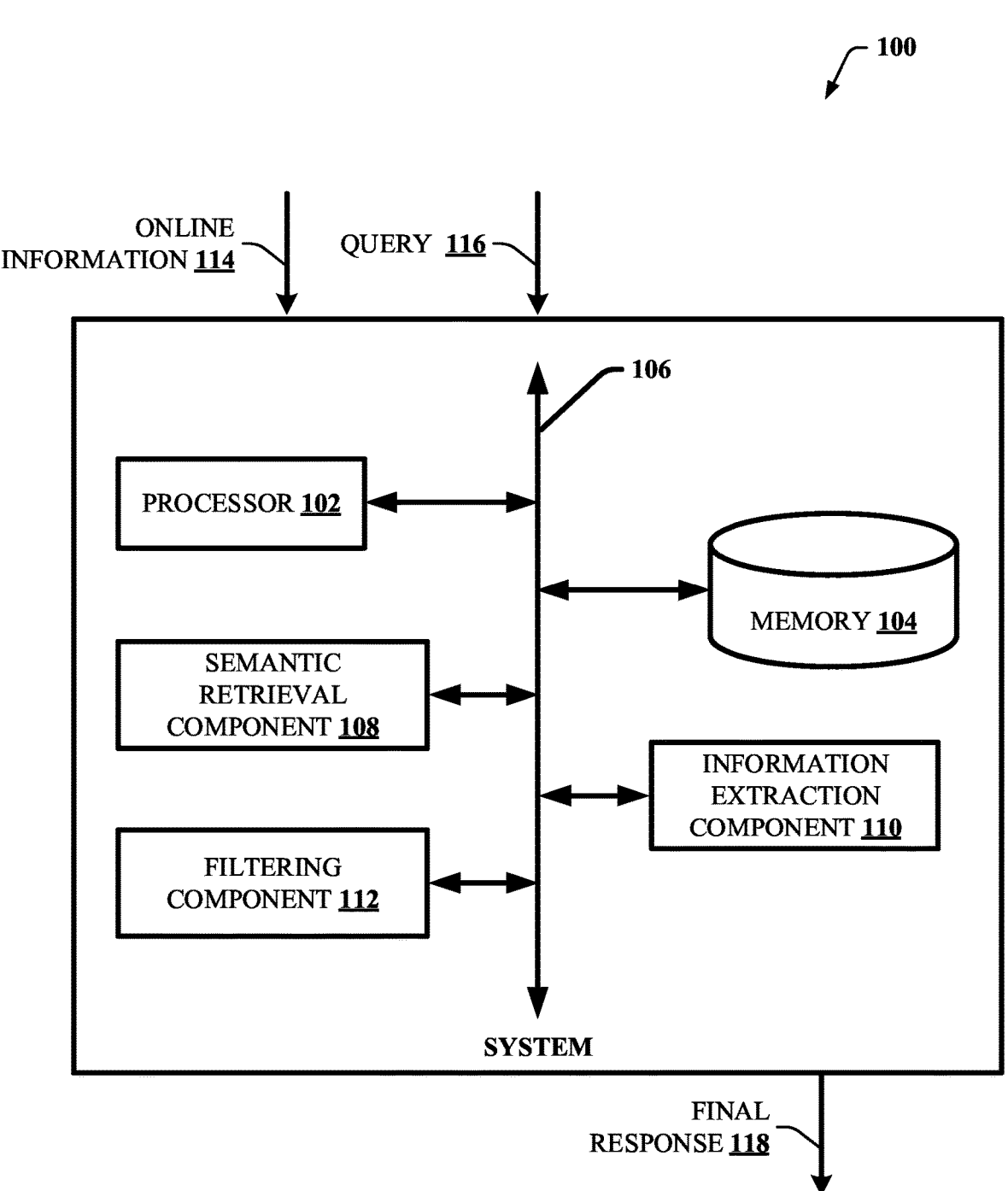
FIG. 1 illustrates a block diagram of an example, non-limiting system that can enhance an LLM using in-context learning combined with online knowledge in accordance with one or more embodiments described herein.

The embodiments depicted in one or more figures described herein are for illustration only, and as such, the architecture of embodiments is not limited to the systems, devices and/or components depicted therein, nor to any particular order, connection and/or coupling of systems, devices and/or components depicted therein. For example, in one or more embodiments, the non-limiting systems described herein, such as non-limiting system 100 as illustrated at FIG. 1, and/or systems thereof, can further comprise, be associated with and/or be coupled to one or more computer and/or computing-based elements described herein with reference to an operating environment, such as the operating environment 1000 illustrated at FIG. 10. For example, system 100 can be associated with, such as accessible via, a computing environment 1000 described below with reference to FIG. 10, such that aspects of processing can be distributed between system 100 and the computing environment 1000. In one or more described embodiments, computer and/or computing-based elements can be used in connection with implementing one or more of the systems, devices, components and/or computer-implemented operations shown and/or described in connection with FIG. 1 and/or with other figures described herein.

In recent years, with continuous development of NLP technology, LLMs have become a direction of significant research in the field of NLP processing. LLMs can learn and understand large-scale natural language data, thereby greatly improving productivity for individuals. However, despite the significant progress made with LLMs, they pose some challenges. For example, a corpus for train LLMs mostly comes from a single country, which can introduce several biases in the training data due to lack of information from other places, leading to poor performances by the LLMs in handling cases from the other places. For example, a training corpus for an LLM can come only from the United Stated of America (USA) or England, and there can be an imbalance in the training data for the LLM in a training lab. As a result, the LLM can lack knowledge about geography, culture, specific industries, etc. related to regions others than the USA or England. When such an LLM is used in a different country, for example, in Japan, there can be a large gap in results generated by the LLM when the LLM is provided queries related to Japan. In other words, transferring the model solution for the LLM from a training region to another region can present challenges, wherein the LLM can generate incorrect results while suggesting that the incorrect results are correct. As such, an inference effect of LLMs is greatly affected by pre-training data. In another example, some LLMs can generate humor that can violate religious beliefs of certain communities in some nations, or provide inappropriate and discriminatory examples towards certain social groups. Secondly, human annotators can have respective subjective biases, which can have a negative impact on LLM training. For example, when an LLM is trained, individuals are needed to label data, and the individuals can introduce subjective opinions in the labelled data. For example, a labeler can be tasked with assigning a "right" or "wrong" label to a sentence, however, the label assigned by the labeler ("right" or "wrong") can depend on the knowledge of the labeler and not on true knowledge related to the sentence. Thus, the labeler can introduce an unwanted effect during training of the LLM. When such an LLM is used in practice for generative AI, the LLM can generate untrustworthy results. In addition, a generative content of LLMs can be uncontrollable and unexplainable, which poses ethical and legal risks for applications of LLMs in certain fields. Reducing the ethical and legal risks caused by biases in training data of LLMs and from annotators, and reducing uncontrollability and increasing explainability of LLMs can be challenging.

Although a series of large-scale models represented by a well-known LLM, have been developed to avoid responding to questions that obviously contradict ethical standards, LLMs still perform poorly when responding to some edge cases and answering questions that need explicit industry knowledge. In fact, the well-known LLM referenced herein generated a tweet in connection with a controversial subject. A popular question-and-answer website has banned any replies generated by the well-known LLM referenced herein. As such, an LLM used in an online customer service system for a travel website can generate suggestions for restaurants that offer nutritious and protein-rich dishes. However, if the LLM is not aware of predominantly vegetarian food preferences of a country, the LLM can recommend to a user from the country to try local restaurants for beef dishes, even if cows are not considered food in that country. This can violate local customs and potentially cause discomfort for the user or offend the user, while raising ethical issues. Therefore, an LLM needs to be enhanced for understanding of local culture and customs to better answer questions. The reason for the challenges described above is that LLMs operate on a series of probability distributions for natural language. The entire inferencing process of an LLM follows a more conditional probability, so the inferencing performance of the LLM is heavily influenced by pre-training data. In the exemplary scenario described above, the keywords "nutritious," "protein," and "beef" appeared frequently in the same context in data used to train the LLM, because of which the LLM learned a co-occurrence of the keywords during training, which led to the final output of recommending restaurants offering beef dishes. Thus, techniques to enhance LLMs to better handle risks associated with conclusions generated by the LLMs can be desirable. Since end-users cannot access the parameters of LLMs developed by large companies, and few users have the computational power to retrain or even fine-tune LLMs at the model level, a method that does not change model parameters while enhancing LLMs can be desirable to ensure reliability and stability of LLM outputs within a reasonable range when answering questions.

Embodiments described herein include systems, computer-implemented methods, and computer program products that can combine in-context learning with online knowledge fusion to improve trustworthiness and reliability of LLM outputs. More specifically, various embodiments herein can fuse contextual information with external knowledge to enhance semantic understanding and knowledge representation capabilities of an LLM, thereby making the LLM more accurate and stable in processing various natural language tasks. Further, various embodiments herein can provide methods to enhance the interpretability and controllability of LLM-generated content as well as evaluate and manage the ethical and legal risks of LLMs, making their applications safer and more reliable.

Various embodiments herein can provide a system that can introduce external knowledge from online sources to solve queries using an LLM by employing the following steps. Before inputting a query to the LLM, an online search engine or internal retrieval system can be used to obtain as much semantically relevant text as possible, to a reference for the LLM, for a query. In various embodiments herein, the internal retrieval system is referred to as a semantic retrieval system. The query can be a question input to the system by a user of the system. Thereafter, the system can be provided with the following prompt template: "Please read the following material and strictly respond to the question based on the knowledge and information in the material provided below [text obtained from search]. Now, my question is [user's question]." Herein, the text obtained from search can refer to the online information and the user's question can refer to the query. This step can employ a method of in-context learning based on which, the LLM can learn new knowledge without performing any backpropagation or model parameter adjustments (although only one-time learning can be possible) and generate responses based on the content of the knowledge.

However, the above method of response can often be rough and one-time only. The LLM cannot read a large amount of additional material when responding to a query every time, because doing so can significantly slow down a reasoning performance of the LLM, and the information obtained from the online search can comprise garbage information, in additional to useful material, that can cause significant interference to the LLM in generating a response. Thus, instead of using a full search text (e.g., the online information obtained through the online search) as an input for in-context learning of the LLM, the full search text can be refined to extract short and refined text (e.g., key knowledge) from a large amount of retrieval text in real-time based on a triplet extracted by the LLM's response. The final application process can utilize the following prompt template for the LLM: "Please read the following material and strictly respond to the question based on the knowledge and information in the material provided below [key knowledge]. Now, my question is [user's question]" or "Please read the following materials, and then answer the questions strictly according to the knowledge and information in the materials. The materials are as follows: [key knowledge]. Now, my question is [user's question]." Herein, the key knowledge can refer to the refined text extracted from the online information.

In various embodiments, a semantic retrieval system can be constructed based on simCSE and a tagging system to implement the approach described above. The tagging system can refer to a tag group system that can be applied for grouping tags related to content. A tag group can be presented as a hierarchy structure and updated dynamically as tags change. Tags employed by the semantic retrieval system can be geographical locations or pre-defined tags in the semantic retrieval system, and the semantic retrieval system can be constructed to search within a certain scope of information using query statements and filter the search using tags (if available), along with a semantic search. The retrieval results of the semantic retrieval system can be a collection of candidate sets in units of sentences. An algorithm based on SPO structure extraction can be used to extract a main structure of each sentence from the collection of candidate sets. SPO extraction can be a speedy process, at the millisecond (ms) level. The extracted SPOs can be organized in a virtual graph in the form of triplets, which can be used for a subsequent step involving a graph structure search to extract the key knowledge from the full text search.

A graph structure search can be useful since a graph structure can better reflect relationships between entities in a sentence. For example, as stated above, in the extracted SPO triplets, S represents the subject, P represents the predicate, and O represents the object of a sentence, wherein the subjects and objects can represent entities in the sentence and their relationships can be represented by a graph. Using a graph structure to generate the key knowledge can start from a global perspective and more comprehensively consider the relationships between the entities, rather than focusing solely on the main part of a sentence that can often have a lot of interference information. In addition, the graph structure can handle complex relationships between entities, such as multiple relationships between entities and weights of the relationships. Therefore, when building a semantic retrieval system, using a graph structure for search can assist in comprehensively and accurately identifying related entities and providing more precise search results.

To utilize the graph structure for the search, a prompt template can be employed to generate a concise response from the LLM and extract an SPO structure from the response of the LLM using the algorithm based on SPO structure extraction referenced above. Thereafter, a triple can be formed using the SPO structure and the graph structure data (e.g., virtual graph) organized from the candidate documents can be queried based on the graph structure. Querying the graph structure data can generate a subgraph containing key knowledge from the candidate documents. The key knowledge can be organized in the SPO form and incorporated into the following prompt template: "Please read the following material and strictly answer the question based on the knowledge and information in the material [key knowledge]. Now, my question is [user's question]." The LLM can generate an output based on the prompt template.

Finally, a CRF model can be used to further filter the content of the LLM output. The filtering process can serve as a double insurance to ensure that the language generation response (i.e., response generated by the LLM) can be explicitly constrained within a fixed knowledge scope (candidate documents) in terms of semantic knowledge. The CRF model can be trained using local document and knowledge databases, and output constraints of the CRF model can be achieved by defining a state transition matrix. The state transition matrix can be used to represent the transition probability between adjacent labels, which can constrain an output of the CRF model. More specifically, each element in the state transition matrix can represent a transition probability from one label to another, which can be learned by the CRF model through training. In the inference process, the CRF model can score all possible label sequences based on the state transition matrix and select a label sequence with the highest probability as the output. The benefit of doing this can be that the CRF model can further constrain the output of the LLM from a level of language probability distribution. CRF can be beneficial because although the in-context learning method can constrain the LLM in a first layer, due to the unstable nature of LLMs, there can exist a certain probability of the output of the LLM escaping a scope of candidate knowledge. At this stage, the CRF model can be used for a second layer of constraint. The CRF model can provide advantages in terms of fast training speed, relatively high accuracy, fast inference speed, and module independence, making the CRF model suitable for fulfilling the need of adding the second layer of constraint.

When a knowledge archive of the LLM reaches a certain scale, a first level knowledge graph can be built based on the knowledge archive, which can play the role of memory cache (mem-cache) in the memory database. Thereafter, if a question or query provided to the LLM by a user can be answered based on the first level knowledge graph, the system can prioritize answering the query based on the information in the first level knowledge graph. The benefit of employing the first level knowledge graph can be that when the system has been widely used and has accumulated a certain amount of knowledge, the system can avoid LLM inferencing when performing knowledge retrieval, thereby speeding up an inferencing efficiency and accumulating high-quality graph data for subsequent businesses (e.g., business intelligence and data warehouses) to use.

Turning now to FIG. 1, illustrated is a block diagram of an example, non-limiting system 100 that can enhance an LLM using in-context learning combined with online knowledge in accordance with one or more embodiments described herein.

System 100 and/or the components of system 100 can be employed to use hardware and/or software to solve problems that are highly technical in nature (e.g., related to in-context learning, enhancement of LLMs, etc.), that are not abstract and that cannot be performed as a set of mental acts by a human. Further, some of the processes performed may be performed by specialized computers for carrying out defined tasks related to enhancement of LLMs using in-context learning and online knowledge. The system 100 and/or components of the system can be employed to solve new problems that arise through advancements in technologies mentioned above, and/or the like. The system 100 can provide technical improvements to LLMs by improving an inferencing efficiency of an LLM. The system 100 can provide additional improvements in terms of enhancing trustworthiness and reliability of outputs generated by LLMs. In various embodiments, the use of in-context learning combined with online knowledge can make an LLM more attentive to unique circumstances of a user querying the LLM when generating responses to a query, thereby improving credibility of the LLM response. The overall optimization process for enhancing the LLM can be performed without modifying parameters of the LLM, and the LLM can adapt well to various scenarios based on the same basic model of the LLM. In various embodiments, valuable graph structure knowledge can be accumulated during use of the enhanced LLM, forming data assets for responding to subsequent queries.

Discussion turns briefly to processor 102, memory 104 and bus 106 of system 100. For example, in one or more embodiments, the system 100 can comprise processor 102 (e.g., computer processing unit, microprocessor, classical processor, and/or like processor). In one or more embodiments, a component associated with system 100, as described herein with or without reference to the one or more figures of the one or more embodiments, can comprise one or more computer and/or machine readable, writable and/or executable components and/or instructions that can be executed by processor 102 to enable performance of one or more processes defined by such component(s) and/or instruction(s).

In one or more embodiments, system 100 can comprise a computer-readable memory (e.g., memory 104) that can be operably connected to the processor 102. Memory 104 can store computer-executable instructions that, upon execution by processor 102, can cause processor 102 and/or one or more other components of system 100 (e.g., semantic retrieval component 108, information extraction component 110, and/or filtering component 112) to perform one or more actions. In one or more embodiments, memory 104 can store computer-executable components (e.g., semantic retrieval component 108, information extraction component 110, and/or filtering component 112).

System 100 and/or a component thereof as described herein, can be communicatively, electrically, operatively, optically and/or otherwise coupled to one another via bus 106. Bus 106 can comprise one or more of a memory bus, memory controller, peripheral bus, external bus, local bus, and/or another type of bus that can employ one or more bus architectures. One or more of these examples of bus 106 can be employed. In one or more embodiments, system 100 can be coupled (e.g., communicatively, electrically, operatively, optically and/or like function) to one or more external systems (e.g., a non-illustrated electrical output production system, one or more output targets, an output target controller and/or the like), sources and/or devices (e.g., classical computing devices, communication devices and/or like devices), such as via a network. In one or more embodiments, one or more of the components of system 100 can reside in the cloud, and/or can reside locally in a local computing environment (e.g., at a specified location(s)).

As stated above, in addition to processor 102 and/or memory 104, system 100 can comprise one or more computer and/or machine readable, writable and/or executable components and/or instructions that, when executed by processor 102, can enable performance of one or more operations defined by such component(s) and/or instruction(s). For example, in various embodiments, semantic retrieval component 108 can extract information (e.g., online information 114) from an online source, according to query 116, to generate an in-context learning input utilized by an LLM for responding to query 116. For example, system 100 can receive query 116 and system 100 can send query 116 to semantic retrieval component 108 for acquiring online information 114 based on query 116. Semantic retrieval component 108 can extract online information 114 by searching the internet or a knowledge base (or knowledge scope), wherein the knowledge base can be a playbook, documents in a box folder, etc. Semantic retrieval component 108 can use query 116 to extract online information 114, wherein online information 114 can comprise text and data related to query 116 that can be used by the LLM to respond to query 116. In various embodiments, system 100 can be a semantic retrieval system that can interact with an LLM to generate a response to query 116 using the LLM. Querying can be performed by semantic retrieval component 108 via embedding technologies that can be used to record paragraphs/text related to query 116. For example, query 116 can be converted to a vector and documents related to query 116 identified as part of the online search can be split into paragraphs. The paragraphs can be converted to embeddings and the embeddings can be used to extract online information 114 based on query 116.

In various embodiments, semantic retrieval component 108 can use simCSE, tagging and semantic searching to extract online information 114 from the online source. For example, semantic retrieval component 108 can extract online information 114 based on different types of metadata, such as geographic location, background knowledge, external knowledge, etc. For example, a user can text query 116 to system 100 through a device (e.g., a mobile phone, laptop, computer, etc.), and a location of the device can be recorded by system 100. For example, an LLM can be used to develop an application for a specific use case, and the application can be accessible to a user through a smart phone. The user can message query 116 to the application and based on a geographic location of the user, system 100 can determine that the user is in a country in Southeast Asia. Based on the use case of the application and determination of the location of the user, system 100 can employ semantic retrieval component 108 to extract online information 114. For example, online information 114 can comprise text, documents, etc. related to the country in Southeast Asia, and the geographic location can be a metadata for query 116. System 100 can use the geographic location to accurately identify an intention of query 116. Thus, online information 114 can be based on query 116, as well as information associated with an individual or user (e.g., geographic information, etc.) providing query 116. As such, system 100 can interact with global positioning system (GPS) and/or other systems associated with a user device.

Similarly, system 100 can use background knowledge as metadata to extract query 116. For example, a query can precede query 116, such that the two queries can be sequential and query 116 can be based on the preceding query. In this scenario, background knowledge can represent a developed memory of system 100, such that system 100 can identify a real intention behind query 116 based on historical query records. External knowledge as metadata can refer to a portion of online information 114 that can be retrieved by employing searching technologies such as, for example, a web search engine, etc., to record data related to query 116. Additional or fewer categories of metadata can be utilized by semantic retrieval component 108 based on a use case of an application driven by the LLM. For example, an application can be centered around information retrieval related to museums, marketing, business, etc. Thus, in addition to querying by the user, system 100 can perform additional information gathering in terms of metadata, wherein the metadata can be acquired based on a location of a smartphone associated with the user, background knowledge based on historical data acquired by system 100, external knowledge, etc. Query 116 can be global or local, depending on an application of the LLM, and applications can be developed for various use cases such as for business purposes, marketing purposes, etc. Thus, a meaning and intention of query 116 can be identified by system 100 depending on a use case of the LLM.

As discussed above, semantic retrieval component 108 can simCSE to extract online information 114 from the online source. SimCSE can be based on contrastive learning. SimCSE can convert data into embeddings and utilize the embeddings to build a feature map. Semantic retrieval component 108 can query the feature map to generate online information 114. More specifically, online knowledge related to query 116 can comprise various data sources (e.g., geographical information, background information, etc.) and data types (e.g., tables, text, structured data, unstructured data, etc.), and simCSE can convert the various data types to embeddings or vectors and build a feature map based on the embeddings or the vectors to allow semantic retrieval component 108 to query the feature map using a unified interface to generate online information 114. For example, the simCSE framework can employ decoders to convert data into embeddings, wherein respective decoders can convert respective data types into respective embeddings. Thereafter, the simCSE framework can employ encoders to generate results based on the embeddings. For example, one encoder can convert one embedding into a series number such as a vector or a tensor, and the simCSE framework can combine respective vectors or respective tensors corresponding to the respective embeddings into a feature map. The feature map can be used in contrastive loss computing that can make data in the feature map have meaning in a vector space. Thereafter, semantic retrieval component 108 can use query 116 to query the feature map and extract information that can be most useful in generating a response to query 116.

Retrieval results of semantic retrieval component 108 can be a collection of candidate sets in units of sentences. The collection of candidate sets can be referred to as candidate knowledge, and in various embodiments, information extraction component 110 can use an algorithm based on SPO extraction to extract the respective SPO structures from respective candidate knowledge sentences. Data comprised in candidate knowledge can be in the form of text, data tables, etc., since candidate knowledge can represent key information related to query 116, extracted from the online knowledge which can comprise various data types (e.g., text, data table, etc.). Thus, semantic retrieval component 108 can use the feature map to perform neural searching to extract online information 114 comprising candidate knowledge, wherein candidate knowledge can be readable by a human.

In various embodiments, information extraction component 110 can generate a virtual graph based on the respective SPO structures of the respective candidate knowledge sentences retrieved by semantic retrieval component 108. For example, information extraction component 110 can combine candidate knowledge of different data formats into a unified data format. For example, information extraction component 110 can combine text data, Structured Query Language (SQL) data, etc. into a knowledge graph format having a logical data structure. A logical data structure of a knowledge graph combined with a generative data structure utilized by LLMs for responding to queries can assist in generating a logical and reasonable response to query 116. Information extraction component 110 can combine respective triples or triplets (e.g., the respective SPO structures) of respective candidate knowledge sentences to generate the knowledge graph because individual triples can have similar nodes. In other words, individual SPO structures can have common nodes that can be combined to generate one knowledge graph. In scenarios where the individual triples do not have any common nodes, the individual triples can be employed as independent triples for a subsequent graph-based search. The knowledge graph can be a virtual graph, which can indicate that the knowledge graph can exist only in memory, without the knowledge graph information needing storage on a disk. For example, the knowledge graph can be stored in cloud memory, cell phone memory, computer memory, etc.

As stated elsewhere herein, an SPO triple can represent a subject-predicate-object relationship between entities in a sentence. As such, the knowledge graph can better reflect relationships between entities from sentences of the candidate knowledge. For long paragraphs in the candidate knowledge, entities and relationships between entities can be more complex, and in case of tables in the candidate knowledge, wherein such tables can comprise structured data such as current names, values, etc., information extraction component 110 can convert the structured data into SPO triples comprising entities and relationships between the entities. In an SPO triple, the entities can form nodes of the SPO triple. In various embodiments, information extraction component 110 can further extract an SPO structure of an initial response generated by the LLM using the algorithm based on SPO structure extraction. For example, a prompt template can be employed to generate a concise response from the LLM and information extraction component 110 can extract an SPO structure from the response of the LLM using the algorithm based on SPO structure extraction referenced above. Thereafter, a triple can be formed using the SPO structure, and the virtual graph organized from the candidate documents can be queried based on the graph structure.

For example, in various embodiments, semantic retrieval component 108 can use the virtual graph and the SPO structure extracted from the initial response generated by the LLM to generate a subgraph that can be used by the LLM for generating a response to query 116. For example, information extraction component 110 can form a triple using the SPO structure extracted from the initial response generated by the LLM to perform graph searching of the virtual graph to generate a key knowledge subgraph. That is, semantic retrieval component 108 can use the SPO triple generated from the initial response of the LLM to search the knowledge graph and generate the key knowledge subgraph. The key knowledge subgraph can be a virtual subgraph. Information extraction component 110 can further use graph data-to-text conversion methods to convert the key knowledge subgraph to text, wherein the text can represent the key knowledge in a prompt template that system 100 can provide to the LLM. For example, the LLM can receive the following prompt template: "Please read the following material and strictly respond to the question based on the knowledge and information in the material provided below [key knowledge]. Now, my question is [user's question]." Herein, the key knowledge can refer to the text converted from the key knowledge subgraph and the user's question can refer to query 116. The LLM can generate a response to query 116 based on the prompt template. Stated differently, a final input into the LLM can include the prompt template, the key knowledge and query 116. For example, a user can provide query 116 and at the backend, query 116 can be used by system 100 to generate the key knowledge, wherein a prompt template, the key knowledge and query 116 can be combined into a single final prompt (i.e., in-context learning input) provided to the LLM.

In various embodiments, filtering component 112 can use a CRF model to filter the response generated by the LLM and constraint the response within a semantic knowledge scope for query 116. For example, filtering the response generated by the LLM can generate final response 118, and CRF can act as a filter or guarantee that contents of final response 118 can be within a semantic knowledge scope for query 116. As discussed above, the online knowledge can comprise various data types, for example, text, structured data format, geographical knowledge, etc. Such various data types can be converted to text for training the CRF model because the CRF model can only be trained on text.

In various embodiments, responses generated by the LLM over time can be used to build a first level knowledge graph that the LLM can use to respond to subsequent queries. For example, upon a knowledge archive of the LLM reaching a certain scale, a first level knowledge graph can be built (e.g., by information extraction component 110) based on the knowledge archive, which can play the role of mem-cache in the memory database. Thereafter, if a question or query provided to the LLM by a user can be answered based on the first level knowledge graph, system 100 can prioritize answering the query based on the information in the first level knowledge graph. On the contrary, if the question or the query cannot be answered based on the first level knowledge graph, system 100 can utilize a prompt template to answer the question or the query by extracting online knowledge and building a key knowledge subgraph, as described heretofore. The benefit of employing the first level knowledge graph can be that when system 100 has been widely utilized and has accumulated a certain amount of knowledge, system 100 can avoid LLM inferencing based on a full search text when performing knowledge retrieval, thereby speeding up an inferencing efficiency of the LLM and accumulating high-quality graph data for businesses (e.g., business intelligence and data warehouses) to use. As such, the first level knowledge graph can increase inference efficiency of the LLM above a defined threshold. In various embodiments, the first level knowledge graph can be saved as a virtual graph.

In summary, various embodiments herein can allow system 100 (a semantic retrieval system or internal retrieval system) to employ simCSE and a tagging system (e.g., as opposed to using a traditional system such as a query sentence transformer) to perform an online knowledge search based on a query (e.g., query 116). As discussed earlier, simCSE can be a construct for a learning method that can combine a tagging search and different types of data sources, and that can efficiently combine semantic searching and a tagging system to generate candidate knowledge. The candidate knowledge can be converted to a knowledge graph utilized for extracting key knowledge that can be used by an LLM for responding to the query. The tagging system can refer to a tag group system that can be applied for grouping tags related to content. A tag group can be presented as a hierarchy structure and updated dynamically as tags change. System 100 can perform an initial full online knowledge search based on query 116 as well as key knowledge extraction. As such, system 100 can be powerful enough to handle semantic search, tagging, etc., and system 100 can perform multiple tasks at the same time. Various embodiments herein can combine in-context knowledge with online knowledge to generate structured and reasonable information and use the information for an adapter or structured memory enhanced for an LLM. Such an approach can assist with enhancing understandability and knowledge representation ability of the LLM by generating candidate knowledge by combining metadata, context, and a background system prompt, based on a query, into structured data.

Figure 2:
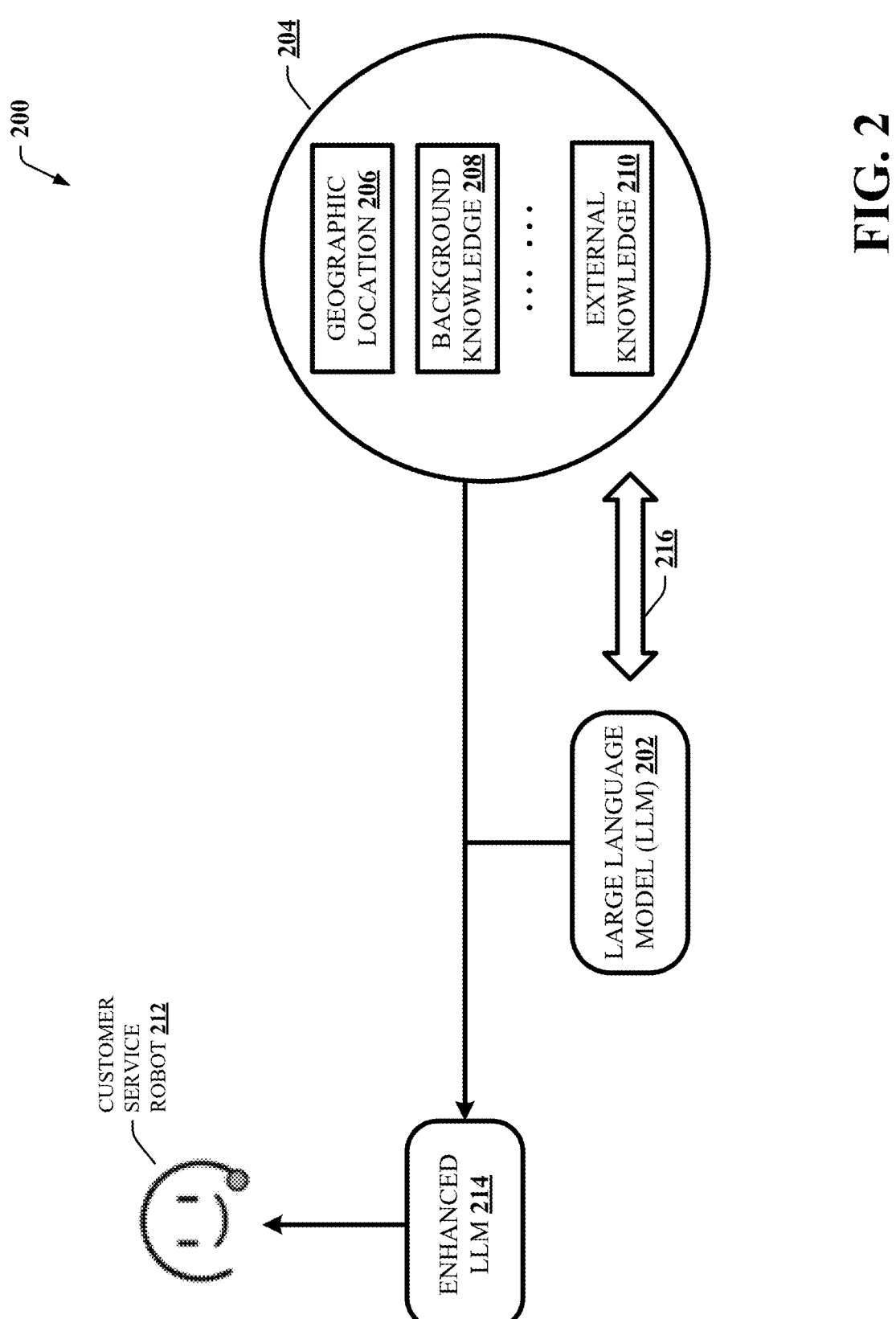
FIG. 2 illustrates a block diagram of an example, non-limiting process that can enhance an LLM using in-context learning combined with online knowledge in accordance with one or more embodiments described herein.

FIG. 2 illustrates a block diagram of an example, non-limiting process 200 that can enhance an LLM using in-context learning combined with online knowledge in accordance with one or more embodiments described herein. One or more embodiments described with respect to FIG. 2 can be performed by one or more components of FIG. 1. Repetitive description of like elements and/or processes employed in respective embodiments is omitted for sake of brevity.

In various embodiments, a system (e.g., system 100) can employ process 200 to combine in-context learning with online knowledge to improve reliability of outputs generated by an LLM (e.g., LLM 202). By fusing contextual information with external knowledge, this approach can enhance semantic understanding and knowledge representation capabilities of LLMs, thereby making LLMs more accurate and stable in processing various natural language tasks. In addition, this approach can enhance the interpretability and controllability of LLM generated content as well evaluate and manage ethical and legal risks of LLMs, making their applications safer and more reliable. A method of enhancing LLM 202, to generate enhanced LLM 214 having an improved reliability of outputs as compared to LLM 202, can be divided into three steps, including, a) constructing a semantic retrieval system based on simCSE and a tagging system, b) refining candidate knowledge, generating in-context learning inputs and using CRF as an output constraint, and c) generating a final response by combining candidate knowledge and archiving the knowledge in a graph structure.

Constructing a semantic retrieval system can be based on simCSE and a tagging system. The tagging system can refer to a tag group system that can be applied for grouping tags related to content. A tag group can be presented as a hierarchy structure and updated dynamically as tags change. Semantic retrieval can comprise performing a search (e.g., by semantic retrieval component 108) within a certain scope using query statements, filtering (e.g., by semantic retrieval component 108) using tags (if available), and performing a semantic search (e.g., by semantic retrieval component 108). For example, the semantic retrieval system can search for online knowledge 204 using the query statements, wherein online knowledge 204 can comprise geographic location 206, background knowledge 208, external knowledge 210, etc. Retrieval results generated by the semantic retrieval system can be a collection of candidate sets in units of sentences, that is, a sentence collection. For the sentence collection in the retrieval results, an algorithm based on SPO structure extraction can be used to extract (e.g., by information extraction component 110) a main structure of each sentence. SPO extraction can be very fast (i.e., at the ms level). Next, the extracted SPO structures can be organized (e.g., by information extraction component 110) into a virtual graph in the form of triplets that can be used for a subsequent step of graph structure search.

The algorithm based on SPO structure extraction, wherein SPO stands for Subject-Predicate-Object, can be designed to identify and extract relationships within text data. The algorithm can operate by analyzing the linguistic and contextual features of text to identify the subject, predicate, and object elements in a sentence. The algorithm can leverage natural language processing techniques, such as part-of-speech tagging, dependency parsing and named entity recognition to recognize these elements and relationships of these elements within text. By doing so, the algorithm can assist in uncovering structured information from unstructured text, making it useful for tasks like information retrieval, knowledge graph construction, and text mining.

Refining candidate knowledge, generating in-context learning inputs, and using CRF as an output constraint can begin by using a prompt template to generate a concise response from LLM 202 and extracting an SPO structure from the concise response generated by LLM 202 using the algorithm based on SPO structure extraction. Thereafter, a triplet can be formed (e.g., by information extraction component 110) using the SPO structure and the virtual graph generated in the previous step can be queried (e.g., by semantic retrieval component) based on the graph structure to derive key knowledge from online knowledge 204. That is, a final response can be generated by LLM 202 based on combining candidate knowledge and archiving the knowledge in a graph structure. The key knowledge can be organized in an SPO form (e.g., by information extraction component 110) and incorporated into a prompt template, and the prompt template can be used as an in-context learning input to LLM 202 to generate an output from LLM 202.

A CRF model can be used (e.g., by filtering component 112) to additionally filter the output generated by LLM 202 to generate a final response from LLM 202. When a knowledge archive accessible to LLM 202 reaches a certain scale, a first level knowledge graph can be constructed (e.g., by information extraction component 110) based on the knowledge archive, which can play a role of a mem-cache in a memory database. If a query can be answered based on the first level knowledge graph, process 200 can prioritize answering the query based on information in the first level knowledge graph. LLM 202 combined with the semantic retrieval system and CRF can represent enhanced LLM 214 that can be an enhanced version of LLM 202 based on in-context learning (at 216) combined with online knowledge 204. Enhanced LLM 214 can be used in products such as customer service robots. For example, customer service robot 212 can be an intelligent robot driven by enhanced LLM 214 that can make restaurant suggestions (e.g., "How about chicken curry? I have some recommendations."). As such, trustworthiness of an output of LLM 202 can be improved by in-context learning combined with online knowledge. Additional aspects of the various embodiments herein are described in greater detail with reference to subsequent figures.

Figure 3:
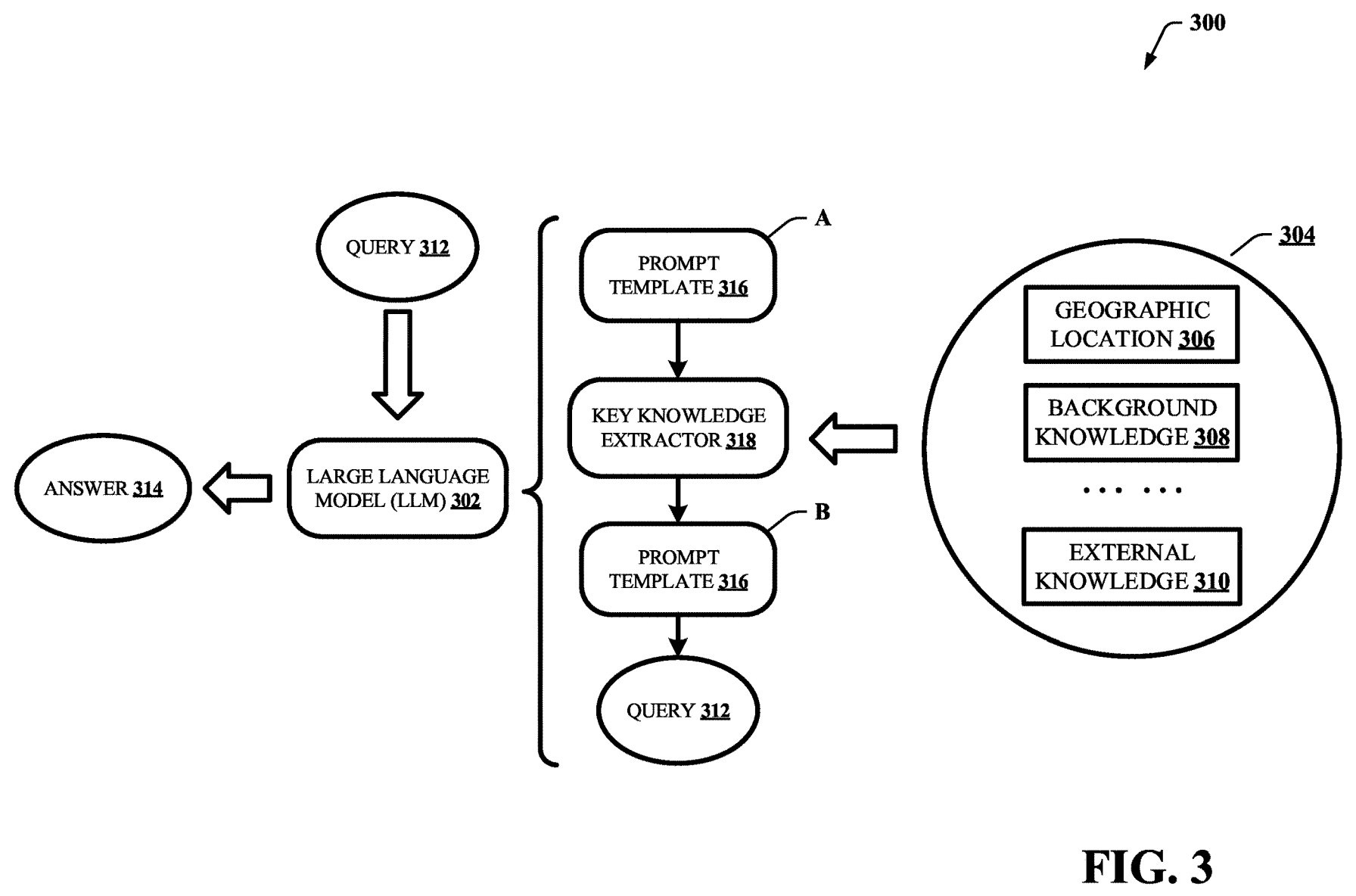

FIG. 3 illustrates another block diagram of an example, non-limiting process 300 that can enhance an LLM using in-context learning combined with online knowledge in accordance with one or more embodiments described herein. One or more embodiments described with respect to FIG. 3 can be performed by one or more components of FIG. 1. Repetitive description of like elements and/or processes employed in respective embodiments is omitted for sake of brevity.

Various embodiments herein can introduce external knowledge from online sources to solve query 312 by employing the following steps. Before inputting query 312 to the LLM 302, a semantic retrieval system (e.g., an online search engine or internal retrieval system) can be used to obtain as much semantically relevant text as possible to query 312 for LLM 302. For example, semantic retrieval system can retrieve online knowledge comprising information (e.g., geographic location, background knowledge, external knowledge, etc.) that can be semantically relevant to query 312. Thereafter, LLM 302 can be provided with prompt template 316. Prompt template 316 can include an instruction such as: "Please read the following material and strictly respond to the question based on the knowledge and information in the material provided below [text obtained from search]. Now, my question is [user's question]." Herein, the text obtained from search can refer to the online knowledge retrieved by the semantic retrieval system and the user's question can refer to query 312. In FIG. 3, block A can refer to the portion "Please read the following material and strictly respond to the question based on the knowledge and information in the material provided below [text obtained from search]" of prompt template 316, and block B can refer to the portion "Now, my question is [user's question]" of prompt template 316. Providing prompt template 316 to LLM 302 can employ a method of in-context learning based on which LLM 302 can learn new knowledge without performing any backpropagation or model parameter adjustments (although only one-time learning can be possible) and generate a response to query 312 based on the content of the knowledge.

However, the method of generating a response by the LLM can often be rough and one-time only. It can be time consuming to have LLM 302 read a large amount of additional material (e.g., online information that can be unrelated to a query) to generate a response each time a query is provided to LLM 302 because doing so can slow down a reasoning performance of LLM 302, and garbage information in the additional material can cause significant interference to a response of LLM 302. Thus, instead of using a full search text as an input for in-context learning, the full search text can be refined to extract (e.g., by key knowledge extractor 318) short and refined text (e.g., key knowledge) from a large amount of retrieval text in real-time based on a triplet extracted by the LLM's response. The final application process can utilize the following prompt for the LLM: "Please read the following material and strictly respond to the question based on the knowledge and information in the material provided below [key knowledge]. Now, my question is [user's question]." Based on the key knowledge, LLM 302 can generate a response to query 312. Thus, in various embodiments, the semantic retrieval system can interact with an LLM to generate answer 314 to query 312.

For example, the semantic retrieval system can receive query 312 and send query 312 to key knowledge extractor 318 (e.g., semantic retrieval component 108) for acquiring online information 304 based on query 312. Key knowledge extractor 318 can extract online information 304 by searching the internet or a knowledge base (or knowledge scope), wherein the knowledge base can be a playbook, documents in a box folder, etc. For example, key knowledge extractor 318 can use query 312 to extract online information 304, wherein online information 304 can comprise text and data related to query 312 that can be used by LLM 302 to respond to query 312. Querying can be performed by key knowledge extractor 318 via embedding technologies that can be used to record paragraphs/text related to query 312. For example, query 312 can be converted to a vector and documents related to query 312 identified as part of the online search can be split into paragraphs. The paragraphs can be converted to embeddings and the embeddings can be used to extract online information 304 based on query 312.

In various embodiments, key knowledge extractor 318 can use simCSE, tagging and semantic searching to extract online information 304 from the online source. For example, key knowledge extractor 318 can extract online information 304 based on different types of metadata, such as geographic location 306, background knowledge 308, external knowledge 310, etc. For example, a user can text query 312 through a device (e.g., a mobile phone, laptop, computer, etc.), and a location of the device can be recorded by the semantic retrieval system. For example, LLM 302 can be used to develop an application for a specific use case, and the application can be accessible to a user through a smart phone. The user can message query 312 to the application and based on a geographic location of the user (e.g., geographic location 306), the semantic retrieval system can determine that the user is in a country in Europe. Based on the use case of the application and determination of geographic location 306, the semantic retrieval system can employ key knowledge extractor 318 to extract online information 304. For example, online information 304 can comprise text, documents, etc. related to the country in Europe, and geographic location 306 can be metadata associated with query 312. The semantic retrieval system can use geographic location 306 to accurately identify an intention of query 312. Thus, online information 304 can be based on query 312, as well as information associated with an individual or user (e.g., geographic location 306, etc.) providing query 312. As such, the semantic retrieval system can interact with GPS and/or other systems associated with a user device.

Similarly, the semantic retrieval system can use background knowledge 308 as metadata to extract query 312. For example, a query can precede query 312, such that the two queries can be sequential and query 312 can be based on the preceding query. In this scenario, background knowledge 308 can represent a developed memory of the semantic retrieval system, such that the semantic retrieval system can identify a real intention behind query 312 based on historical query records. External knowledge 310 as metadata can refer to a portion of online information 304 that can be retrieved by employing searching technologies such as, for example, a web search engine, etc., to record data related to query 312. Additional or fewer categories of metadata can be utilized by key knowledge extractor 318 based on a use case of an application driven by LLM 302. For example, an application can be centered around information retrieval related to museums, marketing, business, etc. Thus, in addition to querying by the user, an additional search can be performed by the semantic retrieval system in terms of metadata, wherein the metadata can be acquired based on a location of a smartphone associated with the user, background knowledge 308 based on historical data acquired by the semantic retrieval system, external knowledge 310, etc. Query 312 can be global or local, depending on an application of LLM 302, and applications can be developed for various use cases such as for business purposes, marketing purposes, etc. Thus, a meaning and intention of query 312 can be identified by the semantic retrieval system depending on the application.

Key knowledge extractor 318 can facilitate the online knowledge search because online knowledge can comprise various data sources (e.g., text, GPS, metadata, etc.) and various data types (e.g., structured data, unstructured data, etc.), however, only a portion of all the online knowledge that can be searched for query 312 can be useful in generating answer 314 based on query 312. Thus, key knowledge extractor 318 can identify the portion of the online knowledge that can be useful for query 312, and the useful knowledge (e.g., online information 304) can be combined to have a unified form in a data structure. Key knowledge extractor 318 can be a component of the semantic retrieval system that can extract the online knowledge and interact with LLM 302. In various embodiments, key knowledge extractor 318 can employ simCSE to extract online information 304 from the online source, additional details of which are described with respect to the subsequent figures.

Figure 4:
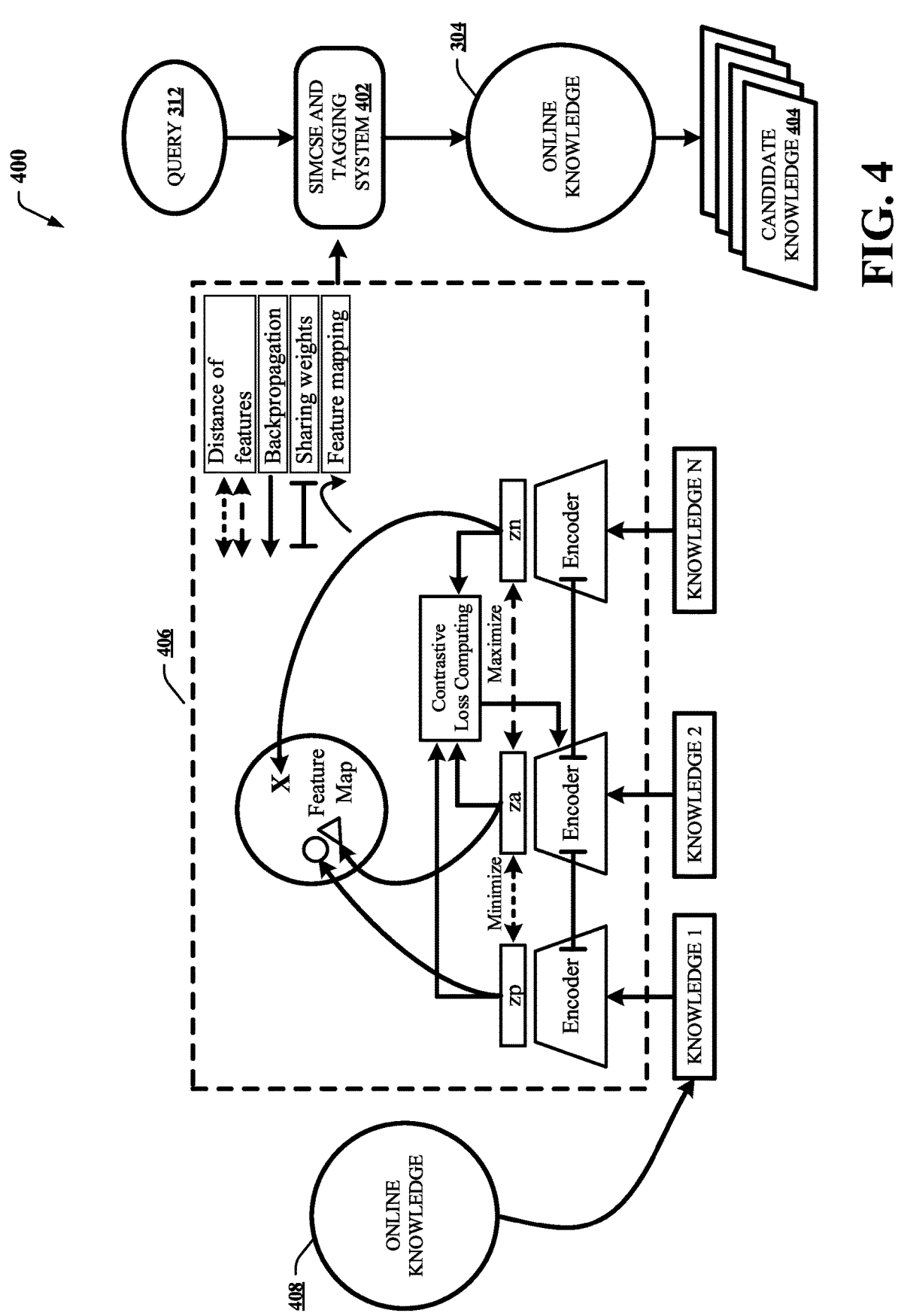
FIG. 4 illustrates a block diagram of an example, non-limiting process employed by a semantic retrieval system to enhance an LLM in accordance with one or more embodiments described herein.

FIG. 4 illustrates a block diagram of an example, non-limiting process 400 employed by a semantic retrieval system to enhance an LLM in accordance with one or more embodiments described herein. One or more embodiments described with respect to FIG. 4 can be performed by one or more components of FIG. 1. Repetitive description of like elements and/or processes employed in respective embodiments is omitted for sake of brevity.

With continued reference to FIG. 3, illustrated is process 400 employed by a semantic retrieval system to retrieve online information 304 based on simCSE and tagging system 402, wherein online information 304 can be used to solve query 312. Before inputting query 312 to LLM 302, the semantic retrieval system can be used to obtain as much semantically relevant text as possible to a reference for LLM 302 for query 312, and the semantic retrieval system can introduce external knowledge from online sources to solve query 312. For example, semantic retrieval system can retrieve online information 304 comprising information that can be semantically relevant to query 312. Semantic retrieval can comprise performing a search within a certain scope using query statements, filtering using tags (if available), and performing a semantic search. For example, the semantic retrieval system can use key knowledge extractor 318 (e.g., semantic retrieval component 108) to extract online information 304 from online knowledge 408 using the query statements, wherein online knowledge 408 can comprise information such as geographic location, background knowledge, external knowledge, etc. related to query 312.

SimCSE can be based on contrastive learning, and SimCSE can convert data into embeddings and utilize the embeddings to build a feature map. Key knowledge extractor 318 can query the feature map to generate online information 304. More specifically, online knowledge 408 related to query 312 can comprise various data sources (e.g., geographical information, background information, etc.) and data types (e.g., tables, text, structured data, unstructured data, etc.). SimCSE can convert the various data types to embeddings or vectors and build a feature map based on the embeddings or the vectors. Key knowledge extractor 318 can query the feature map using a unified interface to generate online information 304. Block 406 can illustrate a simCSE framework employed by the semantic retrieval system to extract online information 304, along with a legend. The simCSE framework can employ decoders to convert data into embeddings, wherein respective decoders can convert respective data types into respective embeddings. Thereafter, the simCSE framework can employ encoders to generate results based on the embeddings. For example, one encoder can convert one embedding into a series number such as a vector or a tensor, and the simCSE framework can combine respective vectors or respective tensors corresponding to the respective embeddings into a feature map. The feature map can be used in contrastive loss computing that can make data in the feature map have meaning in a vector space.

In FIG. 4, knowledge 1, knowledge 2, . . . , knowledge N can represent information of respective data types in online knowledge 408, wherein N can be a positive integer. For example, knowledge 1 can be data in a text format, knowledge 2 can be geographical information, knowledge N can be structured data comprising tags or a name of an application, and so on. Further, each of knowledge 1, knowledge 2, . . . , knowledge N can be associated with respective decoders that can convert information from knowledge 1, knowledge 2, . . . , knowledge N into respective embeddings in block 406. As discussed above, the encoders illustrated in block 406 can be used to generate results of each of the respective embeddings. For example, the encoder receiving knowledge 1, can convert knowledge 1 (e.g., a data type associated with knowledge 1) into a series number such as a vector or a tensor, and vectors/tensors for each of knowledge 1, knowledge 2, . . . , knowledge N can be converted to the feature map illustrated in block 406. The feature map can be used in contrastive loss computing to cause data in the feature map have meaning in vector space. Thereafter, key knowledge extractor 318 can use query 312 to query the feature map and extract information that can be most useful in generating a response to query 116. Retrieval results generated by key knowledge extractor 318 can be a collection of candidate sets in units of sentences, and the collection of candidate sets can be represented as candidate knowledge 404. For example, key knowledge extractor 318 can use the feature map to perform neural searching to extract online information 304 comprising candidate knowledge 404, wherein candidate knowledge 404 can be readable by a human. Candidate knowledge 404 can be used to extract key knowledge that can be provided to LLM 302 to generate a response to query 312, additional details of which are described with reference to subsequent figures.

Figure 5:
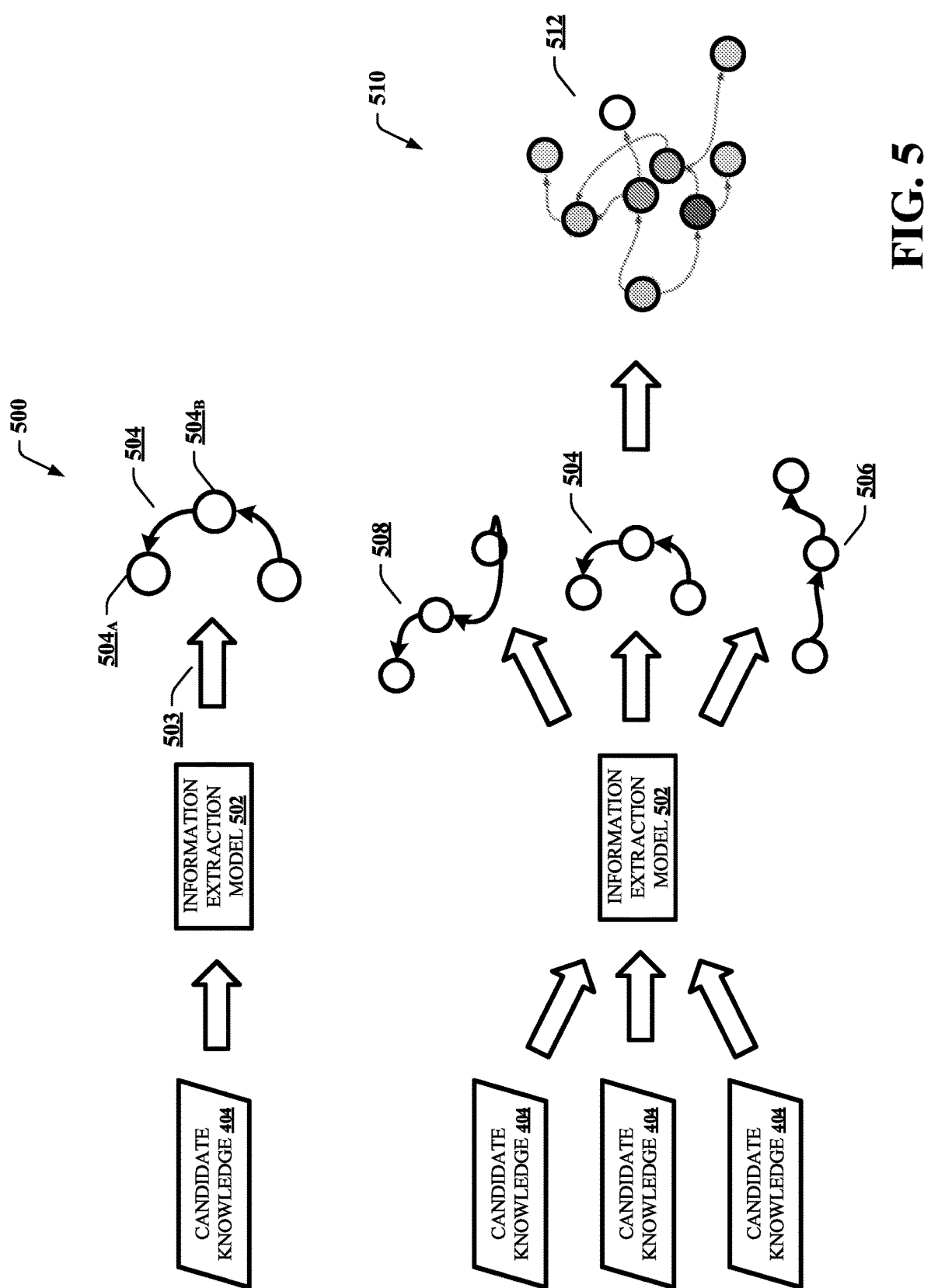
FIG. 5 illustrates a block diagram of an example, non-limiting process that can extract SPO structures from candidate knowledge to enhance an LLM in accordance with one or more embodiments described herein.

FIG. 5 illustrates a block diagram of an example, non-limiting process 500 that can extract SPO structures from candidate knowledge to enhance an LLM in accordance with one or more embodiments described herein. One or more embodiments described with respect to FIG. 5 can be performed by one or more components of FIG. 1. Repetitive description of like elements and/or processes employed in respective embodiments is omitted for sake of brevity.

With continued reference to FIG. 4, retrieval results of key knowledge extractor 318 (e.g., semantic retrieval component 108) can be a collection of candidate sets in units of sentences. The collection of candidate sets can be referred to as candidate knowledge 404, and in various embodiments, information extraction model 502 (e.g., information extraction component 110) can use an algorithm based on SPO extraction to extract the respective SPO structures from respective candidate knowledge sentences comprised in candidate knowledge 404. For candidate knowledge 404 in the retrieval results generated by key knowledge extractor 318 (e.g., semantic retrieval component 108), the algorithm based on SPO structure extraction can be used to extract a main structure of each sentence from candidate knowledge 404. For example, illustrated at 500 is SPO triplet 504 extracted (e.g., at 503) from a single document of candidate knowledge 404 by information extraction model 502. Likewise, illustrated at 510 are respective SPO triplets, SPO triplet 504, SPO triplet 506 and SPO triplet 508, extracted by information extraction model 502 from respective documents of candidate knowledge 404. SPO extraction can be very fast (i.e., at the ms level).

Information extraction model 502 can organize the extracted SPO structures (e.g., SPO triplets) into graph 512, wherein graph 512 can be used for a subsequent step of graph structure search. Stated differently, information extraction model 502 can generate graph 512 based on the respective SPO structures of the respective candidate knowledge sentences retrieved by key knowledge extractor 318. For example, information extraction model 502 can combine candidate knowledge of different data formats into a unified data format. For example, information extraction model 502 can combine text data, SQL data, etc. into graph 512, wherein graph 512 can have a logical data structure. A logical data structure of graph 512 combined with a generative data structure utilized by LLMs for responding to queries can assist in generating a logical and reasonable response to query 312. Information extraction model 502 can combine respective triples or triplets (e.g., the respective SPO structures) of respective candidate knowledge sentences to generate graph 512 because individual triples can have similar nodes. In other words, individual SPO structures can have common nodes that can be combined to generate one knowledge graph. In FIG. 5, common nodes in SPO triplets 504, 506 and 508 are illustrated with the same pattern. For example, the middle node for each of SPO triplet 504, SPO triplet 506 and SPO triplet 508 is illustrated with the same pattern, indicating that the node is common in all three triplets. With reference to knowledge 1, knowledge 2, . . . , knowledge N of FIG. 4, the common nodes can indicate nodes that can be common to each of knowledge 1, knowledge 2, . . . , knowledge N. In scenarios where the individual triples do not have any common nodes, the individual triples can use be employed as independent triples for a subsequent graph-based search. Graph 512 can be a virtual graph, which can indicate that the graph 512 can exist only in memory, without being storage on a disk. For example, graph 512 can be stored in cloud memory, cell phone memory, computer memory, etc.

As stated elsewhere herein, an SPO triple can represent a subject-predicate-object relationship between entities in a sentence. As such, graph 512 can better reflect relationships between entities from sentences of candidate knowledge 404. For long paragraphs in candidate knowledge 404, entities and relationships between entities can be more complex, and in case of tables in candidate knowledge 404, wherein such tables can comprise structured data such as current names, values, etc., information extraction model 502 can convert the structured data into SPO triples comprising entities and relationships between the entities. In an SPO triple, the entities can form nodes of the SPO triple. For example, SPO triplet 504 can correspond to the sentence "I like apples," wherein the word "I" can be the subject of the sentence, the word "apples" can be the object of the sentence and the word "like" can be the predicate of the sentence. Thus, in SPO triplet 504, node 504$_A$ can correspond to word "I," node 504$_B$ can correspond to the word "apples," and the edge connecting node 504$_A$ and node 504$_B$ can correspond to the word "like." In various embodiments, information extraction model 502 can further extract an SPO structure of an initial response generated by LLM 302 based on query 312 using the algorithm based on SPO structure extraction. In various embodiments, key knowledge extractor 318 can use graph 512 and the SPO structure of the initial response to generate a subgraph that can be used by LLM 302 for generating a response to query 312, as detailed with reference to FIG. 6.

Figure 6:
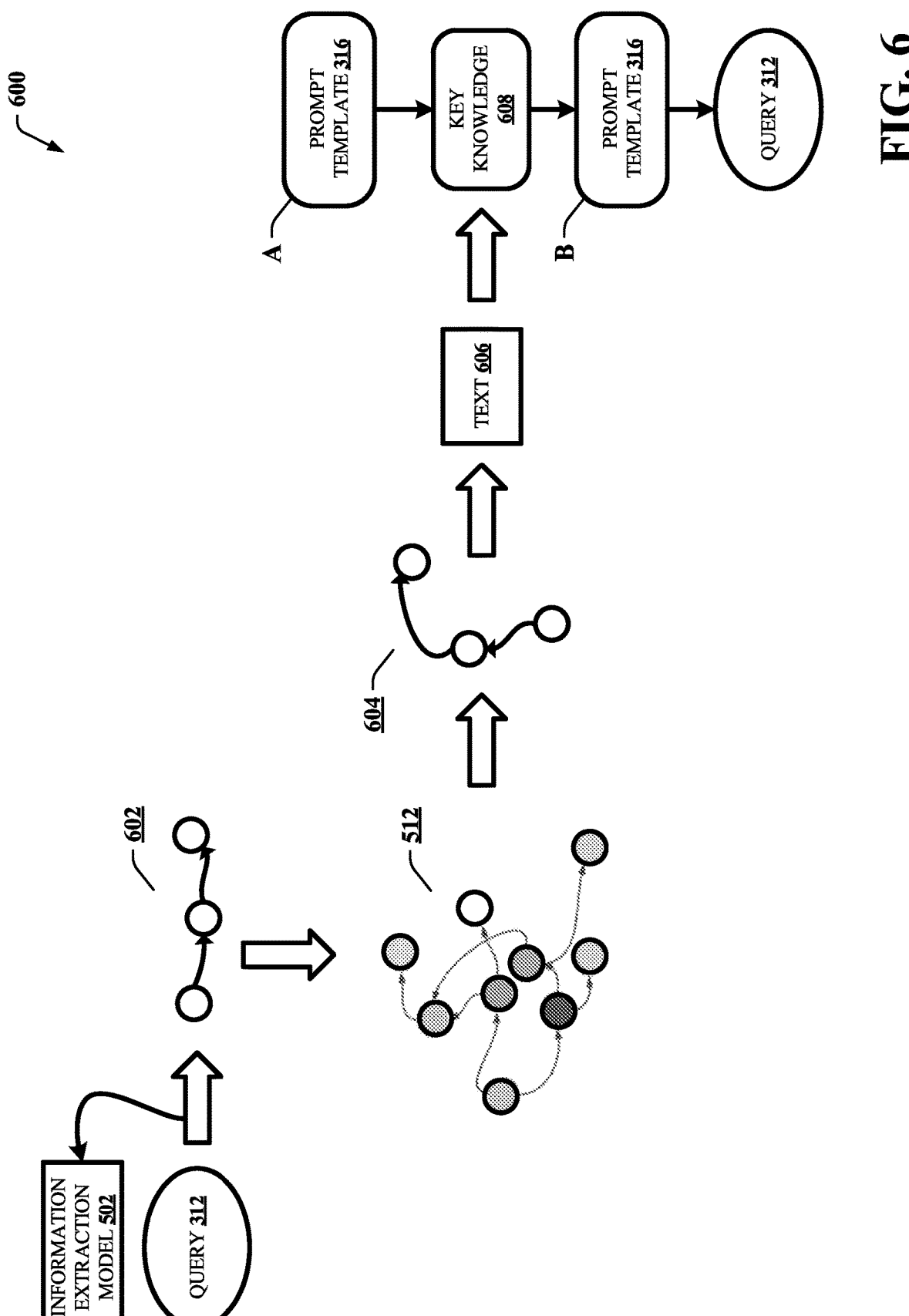
FIG. 6 illustrates a block diagram of an example, non-limiting process that can generate a key knowledge sub graph to extract key knowledge for an LLM in accordance with one or more embodiments described herein.

FIG. 6 illustrates a block diagram of an example, non-limiting process 600 that can generate a key knowledge subgraph to extract key knowledge for an LLM in accordance with one or more embodiments described herein. One or more embodiments described with respect to FIG. 6 can be performed by one or more components of FIG. 1. Repetitive description of like elements and/or processes employed in respective embodiments is omitted for sake of brevity.

With continued reference to FIG. 5, key knowledge extractor 318 (e.g., semantic retrieval component 108) can perform a graph structure search based on an SPO structure of an initial response generated by LLM 302 based on query 312. For example, a prompt template can be used to generate a concise response from LLM 302 based on query 312, and information extraction model 502 (e.g., information extraction component 110) can extract an SPO structure from the concise response generated by LLM 302 using an SPO structure extraction algorithm. Thereafter, information extraction model 502 can form SPO triple 602 using the SPO structure and key knowledge extractor 318 can query graph 512 based on SPO triple 602 to derive text 606. Text 606 can represent key knowledge 608 based on query 312, and text 606 can be organized in an SPO form (e.g., by information extraction model 502) and incorporated into prompt template 316. Prompt template 316 can be used to generate an output from LLM 302 based on text 606, such that LLM 302 can respond to query 312 efficiently, without reading a large amount of additional material based on the full search text. As stated elsewhere herein, responding to a query based on a full search text (e.g., using all the online information extracted for the query as opposed to key knowledge) every time can slow down a reasoning performance of LLM 302, and garbage information in the additional material can cause significant interference in generating a response.

The SPO structure extraction algorithm, wherein SPO stands for Subject-Predicate-Object, can be designed to identify and extract relationships within text data. The algorithm can operate by analyzing the linguistic and contextual features of text to identify the subject, predicate, and object elements in a sentence. The algorithm can leverage natural language processing techniques, such as part-of-speech tagging, dependency parsing and named entity recognition to recognize these elements and relationships of these elements within text. By doing so, the algorithm can assist in uncovering structured information from unstructured text, making it useful for tasks like information retrieval, knowledge graph construction, and text mining.

The graph structure search can be useful since the structure of graph 512 can better reflect relationships between entities of candidate knowledge 404. As stated elsewhere herein, in an SPO triplet, S represents the subject, P represents the predicate, and O represents the object of a sentence, wherein the subject and the object can represent entities in the sentence and relationships of the entities can be represented by a graph. Using a graph structure for search can start from a global perspective and more comprehensively consider the relationships between the entities, rather than focusing solely on the main part of a sentence that can often have a lot of interference information. In addition, the graph structure can handle complex relationships between entities, such as multiple relationships between entities and weights of the relationships. Therefore, when building the semantic retrieval system, using a graph structure for search can more comprehensively and accurately find related entities and provide more precise search results.

Key knowledge subgraph 604 can be a virtual subgraph. Information extraction model 502 can use graph data-to-text conversion methods to convert the key knowledge subgraph to text 606. As stated above, text 606 can represent key knowledge 608, that is, the key knowledge in prompt template 316 that the semantic retrieval system can provide to LLM 302. For example, LLM 302 can receive the following prompt template: "Please read the following material and strictly respond to the question based on the knowledge and information in the material provided below [key knowledge]. Now, my question is [user's question]." Herein, the key knowledge can refer to key knowledge 608 and the user's question can refer to query 312. LLM 302 can generate a response to query 312 based on the prompt template. Stated differently, a final input (e.g., in-context learning input) into LLM 302 can include prompt template 316, key knowledge 608 and query 312.

Figure 7:
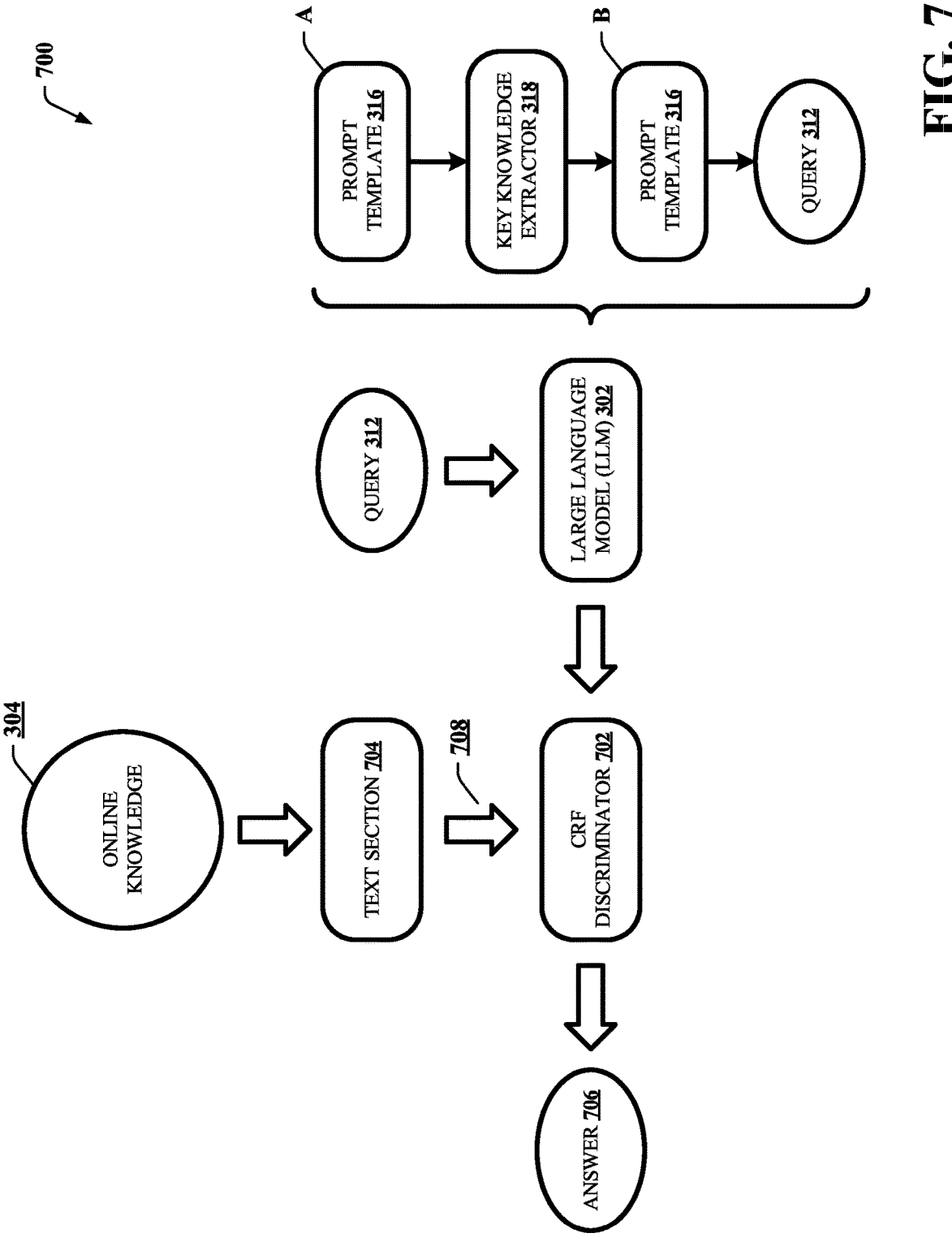
FIG. 7 illustrates a block diagram of an example, non-limiting process that can employ a CRF model to filter an output of an LLM in accordance with one or more embodiments described herein.

FIG. 7 illustrates a block diagram of an example, non-limiting process 700 that can employ a CRF model to filter an output of an LLM in accordance with one or more embodiments described herein. One or more embodiments described with respect to FIG. 7 can be performed by one or more components of FIG. 1. Repetitive description of like elements and/or processes employed in respective embodiments is omitted for sake of brevity.

With continued reference to FIG. 6, filtering component 112 can use CRF discriminator 702 (e.g., CRF model) to further filter the response generated by LLM 302 based on prompt template 316, key knowledge 608 and query 312. For example, filtering the response generated by LLM 302 can generate answer 706 as a final response, and CRF discriminator 702 can act as a filter or guarantee that contents of answer 706 can be within a semantic knowledge scope for query 312. In other words, the filtering process can ensure that a response generated by LLM 302 can be explicitly constrained within a fixed knowledge scope (e.g., of candidate knowledge 404) in terms of semantic knowledge. CRF discriminator 702 can be trained (e.g., at 708) using text section 704 that can represent local document and knowledge databases from online information 304. As state elsewhere herein, online information 304 can comprise various data types, for example, text, structured data formats, geographical knowledge, etc. Such various data types can be converted to text for training CRF discriminator 702 because CRF discriminator 702 can only be trained on text. Output constraints of CRF discriminator 702 can be achieved by defining a state transition matrix.

The state transition matrix can be used to represent the transition probability between adjacent labels, which can constrain an output of a CRF model. More specifically, each element in the state transition matrix can represent a transition probability from one label to another, which can be learned by the CRF model through training. In the inference process, the CRF model can score all possible label sequences based on the state transition matrix and select a label sequence with the highest probability as the output. The benefit of such an approach can be that the CRF model can further constrain the output of LLM 302 from the level of language probability distribution. CRF can be beneficial because although the in-context learning method discussed herein can constrain LLM 302 in a first layer, due to the unstable nature of LLMs, there can exist a certain probability of the response generated by LLM 302 escaping a scope of candidate knowledge 404. Thus, the CRF model can be used for a second layer of constraint. The CRF model can provide advantages in terms of fast training speed, relatively high accuracy, fast inference speed, and module independence, making the CRF model suitable as a second layer of constraint.

Figure 8:
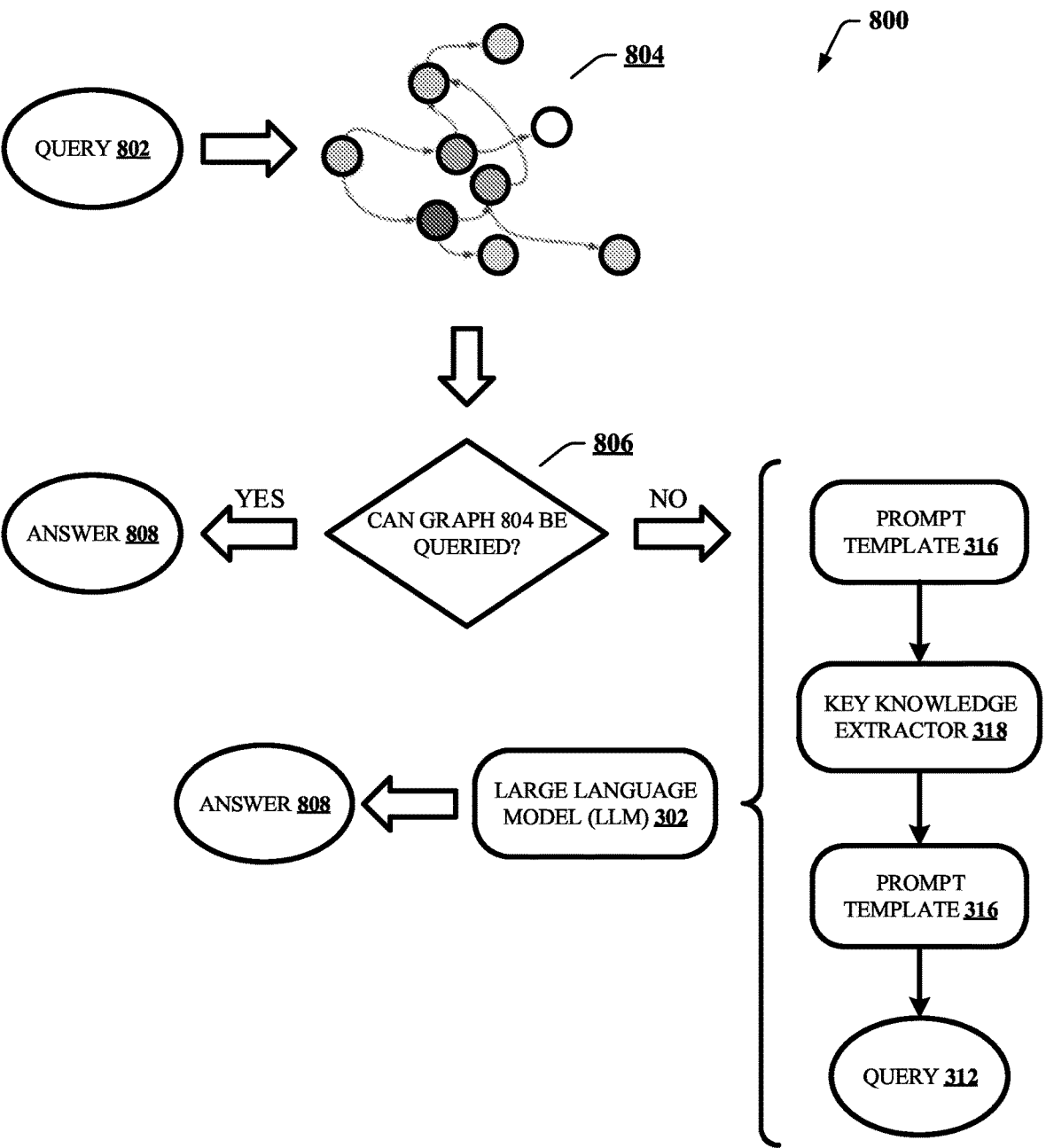
FIG. 8 illustrates a block diagram of an example, non-limiting process that can employ a first level knowledge graph to generate responses to a query provided to an LLM in accordance with one or more embodiments described herein.

FIG. 8 illustrates a block diagram of an example, non-limiting process 800 that can employ a first level knowledge graph to generate responses to a query provided to an LLM in accordance with one or more embodiments described herein. One or more embodiments described with respect to FIG. 8 can be performed by one or more components of FIG. 1. Repetitive description of like elements and/or processes employed in respective embodiments is omitted for sake of brevity.

With continued reference to FIG. 7, upon a knowledge archive of LLM 302 reaching a certain scale, information extraction model 502 (e.g., by information extraction component 110) can build a first level knowledge graph based on the knowledge archive, which can play a role of mem-cache in a memory database. Thereafter, if a question or query provided by a user can be answered based on the first level knowledge graph, the system (e.g., the semantic retrieval system) can prioritize answering the query based on the information in the first level knowledge graph. For example, first level knowledge graph 804 can be constructed upon a knowledge archive of LLM 302 reaching a certain scale, and LLM 302 can attempt to answer query 802 based on first level knowledge graph 804. If first level knowledge graph 804 can be queried for responding to query 802, LLM 302 can generate answer 808 based on first level knowledge graph 804. If the system can determine (e.g., at 806), that first level knowledge graph 804 cannot be queried for query 802, LLM 302 can generate answer 808 based on key knowledge related to query 802 by employing prompt template 316 and key knowledge extractor 318 to extract the key knowledge.

The benefit of employing first level knowledge graph 804 can be that when the system has been widely used and has accumulated a certain amount of knowledge, the system can avoid LLM 302 inferencing when performing knowledge retrieval, thereby speeding up the inference efficiency and accumulating high-quality graph data for subsequent businesses (e.g., business intelligence and data warehouses) to use. As such, first level knowledge graph can increase inferencing efficiency of LLM 302 above a defined threshold. In various embodiments, first level knowledge graph 804 can be saved as a virtual graph.

FIG. 9 illustrates a flow diagram of an example, non-limiting method 900 that can enhance an LLM using in-context learning combined with online knowledge in accordance with one or more embodiments described herein. One or more embodiments described with respect to FIG. 9 can be performed by one or more components of FIG. 1. Repetitive description of like elements and/or processes employed in respective embodiments is omitted for sake of brevity.

At 902, the non-limiting method 900 can comprise extracting (e.g., by semantic retrieval component 108), by a system operatively coupled to a processor, information from an online source, according to a query, to generate an in-context learning input utilized by an LLM for responding to the query.

At 904, the non-limiting method 900 can comprise generating (e.g., by information extraction component 110), by the system, a virtual graph based on respective SPO structures of respective candidate knowledge sentences retrieved from the online source and extracting an SPO structure of an initial response generated by the LLM.

At 906, the non-limiting method 900 can comprise using (e.g., by semantic retrieval component 108), by the system, the virtual graph and the SPO structure to generate a subgraph that can be used by the LLM for generating a response to the query.

At 908, the non-limiting method 900 can comprise using (e.g., by filtering component 112), by the system, a CRF model to filter the response generated by the LLM and constraint the response within a semantic knowledge scope for the query.

At 910, the non-limiting method 900 can comprise using (e.g., by information extraction component 110), by the system, responses generated by the LLM over time to build a first level knowledge graph that the LLM can use to respond to subsequent queries.

At 912, the non-limiting method 900 can comprise determining (e.g., by semantic retrieval component 108), by the system, whether the first level knowledge graph can be queried.

If yes, at 914, the non-limiting method 900 can comprise generating, by the system, a response based on the first level knowledge graph.

If no, at 916, the non-limiting method 900 can comprise generating, by the system, a response based on a prompt template.

For simplicity of explanation, the computer-implemented and non-computer-implemented methodologies provided herein are depicted and/or described as a series of acts. It is to be understood that the subject innovation is not limited by the acts illustrated and/or by the order of acts, for example acts can occur in one or more orders and/or concurrently, and with other acts not presented and described herein. Furthermore, not all illustrated acts can be utilized to implement the computer-implemented and non-computer-implemented methodologies in accordance with the described subject matter. Additionally, the computer-implemented methodologies described hereinafter and throughout this specification are capable of being stored on an article of manufacture to enable transporting and transferring the computer-implemented methodologies to computers. The term article of manufacture, as used herein, is intended to encompass a computer program accessible from any computer-readable device or storage media.

The systems and/or devices have been (and/or will be further) described herein with respect to interaction between one or more components. Such systems and/or components can include those components or sub-components specified therein, one or more of the specified components and/or sub-components, and/or additional components. Sub-components can be implemented as components communicatively coupled to other components rather than included within parent components. One or more components and/or sub-components can be combined into a single component providing aggregate functionality. The components can interact with one or more other components not specifically described herein for the sake of brevity, but known by those of skill in the art.

One or more embodiments described herein can employ hardware and/or software to solve problems that are highly technical, that are not abstract, and that cannot be performed as a set of mental acts by a human. For example, a human, or even thousands of humans, cannot efficiently, accurately and/or effectively enhance an LLM using in-context learning combined with online knowledge as the one or more embodiments described herein can enable this process. And, neither can the human mind nor a human with pen and paper apply CRF to constraint a response generated by an LLM within a fixed knowledge scope, as conducted by one or more embodiments described herein.

Various embodiments of the present disclosure can provide a number of advantages including improving an inferencing efficiency of an LLM. The various embodiments herein can provide additional advantages in terms of improving trustworthiness and reliability of outputs generated by LLMs. In various embodiments, the use of in-context learning combined with online knowledge can make an LLM more attentive to unique circumstances of a user querying the LLM when generating responses to a query, thereby improving credibility of the LLM response. The overall optimization process for enhancing the LLM can be performed without modifying parameters of the LLM, and the LLM can adapt well to various scenarios based on the same basic model of the LLM. In various embodiments, valuable graph structure knowledge can be accumulated during use of the enhanced LLM, forming data assets for responding to subsequent queries.

FIG. 10 illustrates a block diagram of an example, non-limiting operating environment 1000 in which one or more embodiments described herein can be facilitated. FIG. 10 and the following discussion are intended to provide a general description of a suitable operating environment 1000 in which one or more embodiments described herein at FIGS. 1-9 can be implemented.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Computing environment 1000 contains an example of an environment for the execution of at least some of the computer code involved in performing the inventive methods, such as in-context learning input generation code 1045. In addition to block 1045, computing environment 1000 includes, for example, computer 1001, wide area network (WAN) 1002, end user device (EUD) 1003, remote server 1004, public cloud 1005, and private cloud 1006. In this embodiment, computer 1001 includes processor set 1010 (including processing circuitry 1020 and cache 1021), communication fabric 1011, volatile memory 1012, persistent storage 1013 (including operating system 1022 and block 1045, as identified above), peripheral device set 1014 (including user interface (UI), device set 1023, storage 1024, and Internet of Things (IoT) sensor set 1025), and network module 1015. Remote server 1004 includes remote database 1030. Public cloud 1005 includes gateway 1040, cloud orchestration module 1041, host physical machine set 1042, virtual machine set 1043, and container set 1044.

COMPUTER 1001 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 1030. As is well understood in the art of computer technology, and depending upon the technology, performance of a computer-implemented method may be distributed among multiple computers and/or between multiple locations. On the other hand, in this presentation of computing environment 1000, detailed discussion is focused on a single computer, specifically computer 1001, to keep the presentation as simple as possible. Computer 1001 may be located in a cloud, even though it is not shown in a cloud in FIG. 10. On the other hand, computer 1001 is not required to be in a cloud except to any extent as may be affirmatively indicated.

PROCESSOR SET 1010 includes one, or more, computer processors of any type now known or to be developed in the future. Processing circuitry 1020 may be distributed over multiple packages, for example, multiple, coordinated integrated circuit chips. Processing circuitry 1020 may implement multiple processor threads and/or multiple processor cores. Cache 1021 is memory that is located in the processor chip package(s) and is typically used for data or code that should be available for rapid access by the threads or cores running on processor set 1010. Cache memories are typically organized into multiple levels depending upon relative proximity to the processing circuitry. Alternatively, some, or all, of the cache for the processor set may be located "off chip." In some computing environments, processor set 1010 may be designed for working with qubits and performing quantum computing.

Computer readable program instructions are typically loaded onto computer 1001 to cause a series of operational steps to be performed by processor set 1010 of computer 1001 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 1021 and the other storage media discussed below. The program instructions, and associated data, are accessed by processor set 1010 to control and direct performance of the inventive methods. In computing environment 1000, at least some of the instructions for performing the inventive methods may be stored in block 1045 in persistent storage 1013.

COMMUNICATION FABRIC 1011 is the signal conduction paths that allow the various components of computer 1001 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

VOLATILE MEMORY 1012 is any type of volatile memory now known or to be developed in the future. Examples include dynamic type random access memory (RAM) or static type RAM. Typically, the volatile memory is characterized by random access, but this is not required unless affirmatively indicated. In computer 1001, the volatile memory 1012 is located in a single package and is internal to computer 1001, but, alternatively or additionally, the volatile memory may be distributed over multiple packages and/or located externally with respect to computer 1001.

PERSISTENT STORAGE 1013 is any form of non-volatile storage for computers that is now known or to be developed in the future. The non-volatility of this storage means that the stored data is maintained regardless of whether power is being supplied to computer 1001 and/or directly to persistent storage 1013. Persistent storage 1013 may be a read only memory (ROM), but typically at least a portion of the persistent storage allows writing of data, deletion of data and re-writing of data. Some familiar forms of persistent storage include magnetic disks and solid state storage devices. Operating system 1022 may take several forms, such as various known proprietary operating systems or open source Portable Operating System Interface type operating systems that employ a kernel. The code included in block 1045 typically includes at least some of the computer code involved in performing the inventive methods.

PERIPHERAL DEVICE SET 1014 includes the set of peripheral devices of computer 1001. Data communication connections between the peripheral devices and the other components of computer 1001 may be implemented in various ways, such as Bluetooth connections, Near-Field Communication (NFC) connections, connections made by cables (such as universal serial bus (USB) type cables), insertion type connections (for example, secure digital (SD) card), connections made though local area communication networks and even connections made through wide area networks such as the internet. In various embodiments, UI device set 1023 may include components such as a display screen, speaker, microphone, wearable devices (such as goggles and smart watches), keyboard, mouse, printer, touchpad, game controllers, and haptic devices. Storage 1024 is external storage, such as an external hard drive, or insertable storage, such as an SD card. Storage 1024 may be persistent and/or volatile. In some embodiments, storage 1024 may take the form of a quantum computing storage device for storing data in the form of qubits. In embodiments where computer 1001 is required to have a large amount of storage (for example, where computer 1001 locally stores and manages a large database) then this storage may be provided by peripheral storage devices designed for storing very large amounts of data, such as a storage area network (SAN) that is shared by multiple, geographically distributed computers. IoT sensor set 1025 is made up of sensors that can be used in Internet of Things applications. For example, one sensor may be a thermometer and another sensor may be a motion detector.

NETWORK MODULE 1015 is the collection of computer software, hardware, and firmware that allows computer 1001 to communicate with other computers through WAN 1002. Network module 1015 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 1015 are performed on the same physical hardware device. In other embodiments (for example, embodiments that utilize software-defined networking (SDN)), the control functions and the forwarding functions of network module 1015 are performed on physically separate devices, such that the control functions manage several different network hardware devices. Computer readable program instructions for performing the inventive methods can typically be downloaded to computer 1001 from an external computer or external storage device through a network adapter card or network interface included in network module 1015.

WAN 1002 is any wide area network (for example, the internet) capable of communicating computer data over non-local distances by any technology for communicating computer data, now known or to be developed in the future. In some embodiments, the WAN may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 1003 is any computer system that is used and controlled by an end user (for example, a customer of an enterprise that operates computer 1001), and may take any of the forms discussed above in connection with computer 1001. EUD 1003 typically receives helpful and useful data from the operations of computer 1001. For example, in a hypothetical case where computer 1001 is designed to provide a recommendation to an end user, this recommendation would typically be communicated from network module 1015 of computer 1001 through WAN 1002 to EUD 1003. In this way, EUD 1003 can display, or otherwise present, the recommendation to an end user. In some embodiments, EUD 1003 may be a client device, such as thin client, heavy client, mainframe computer, desktop computer and so on.

REMOTE SERVER 1004 is any computer system that serves at least some data and/or functionality to computer 1001. Remote server 1004 may be controlled and used by the same entity that operates computer 1001. Remote server 1004 represents the machine(s) that collect and store helpful and useful data for use by other computers, such as computer 1001. For example, in a hypothetical case where computer 1001 is designed and programmed to provide a recommendation based on historical data, then this historical data may be provided to computer 1001 from remote database 1030 of remote server 1004.

PUBLIC CLOUD 1005 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 1005 is performed by the computer hardware and/or software of cloud orchestration module 1041. The computing resources provided by public cloud 1005 are typically implemented by virtual computing environments that run on various computers making up the computers of host physical machine set 1042, which is the universe of physical computers in and/or available to public cloud 1005. The virtual computing environments (VCEs) typically take the form of virtual machines from virtual machine set 1043 and/or containers from container set 1044. It is understood that these VCEs may be stored as images and may be transferred among and between the various physical machine hosts, either as images or after instantiation of the VCE. Cloud orchestration module 1041 manages the transfer and storage of images, deploys new instantiations of VCEs and manages active instantiations of VCE deployments. Gateway 1040 is the collection of computer software, hardware, and firmware that allows public cloud 1005 to communicate through WAN 1002.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 1006 is similar to public cloud 1005, except that the computing resources are only available for use by a single enterprise. While private cloud 1006 is depicted as being in communication with WAN 1002, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 1005 and private cloud 1006 are both part of a larger hybrid cloud.

The embodiments described herein can be directed to one or more of a system, a method, an apparatus and/or a computer program product at any possible technical detail level of integration. The computer program product can include a computer readable storage medium (or media) having computer readable program instructions thereon for causing a processor to carry out aspects of the one or more embodiments described herein. The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a superconducting storage device and/or any suitable combination of the foregoing. A non-exhaustive list of more specific examples of the computer readable storage medium can also include the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon and/or any suitable combination of the foregoing. A computer readable storage medium, as used herein, is not to be construed as being transitory signals per se, such as radio waves and/or other freely propagating electromagnetic waves, electromagnetic waves propagating through a waveguide and/or other transmission media (e.g., light pulses passing through a fiber-optic cable), and/or electrical signals transmitted through a wire.

Computer readable program instructions described herein can be downloaded to respective computing/processing devices from a computer readable storage medium and/or to an external computer or external storage device via a network, for example, the Internet, a local area network, a wide area network and/or a wireless network. The network can comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device. Computer readable program instructions for carrying out operations of the one or more embodiments described herein can be assembler instructions, instruction-set-architecture (ISA) instructions, machine instructions, machine dependent instructions, microcode, firmware instructions, state-setting data, configuration data for integrated circuitry, and/or source code and/or object code written in any combination of one or more programming languages, including an object oriented programming language such as Smalltalk, C++ or the like, and/or procedural programming languages, such as the "C" programming language and/or similar programming languages. The computer readable program instructions can execute entirely on a computer, partly on a computer, as a stand-alone software package, partly on a computer and/or partly on a remote computer or entirely on the remote computer and/or server. In the latter scenario, the remote computer can be connected to a computer through any type of network, including a local area network (LAN) and/or a wide area network (WAN), and/or the connection can be made to an external computer (for example, through the Internet using an Internet Service Provider). In one or more embodiments, electronic circuitry including, for example, programmable logic circuitry, field-programmable gate arrays (FPGA) and/or programmable logic arrays (PLA) can execute the computer readable program instructions by utilizing state information of the computer readable program instructions to personalize the electronic circuitry, in order to perform aspects of the one or more embodiments described herein.

Aspects of the one or more embodiments described herein are described with reference to flowchart illustrations and/or block diagrams of methods, apparatus (systems), and computer program products according to one or more embodiments described herein. It will be understood that each block of the flowchart illustrations and/or block diagrams, and combinations of blocks in the flowchart illustrations and/or block diagrams, can be implemented by computer readable program instructions. These computer readable program instructions can be provided to a processor of a general-purpose computer, special purpose computer and/or other programmable data processing apparatus to produce a machine, such that the instructions, which execute via the processor of the computer or other programmable data processing apparatus, can create means for implementing the functions/acts specified in the flowchart and/or block diagram block or blocks. These computer readable program instructions can also be stored in a computer readable storage medium that can direct a computer, a programmable data processing apparatus and/or other devices to function in a particular manner, such that the computer readable storage medium having instructions stored therein can comprise an article of manufacture including instructions which can implement aspects of the function/act specified in the flow-chart and/or block diagram block or blocks. The computer readable program instructions can also be loaded onto a computer, other programmable data processing apparatus and/or other device to cause a series of operational acts to be performed on the computer, other programmable apparatus and/or other device to produce a computer implemented process, such that the instructions which execute on the computer, other programmable apparatus and/or other device implement the functions/acts specified in the flow-chart and/or block diagram block or blocks.

The flowcharts and block diagrams in the figures illustrate the architecture, functionality and/or operation of possible implementations of systems, computer-implementable methods and/or computer program products according to one or more embodiments described herein. In this regard, each block in the flowchart or block diagrams can represent a module, segment and/or portion of instructions, which comprises one or more executable instructions for implementing the specified logical function. In one or more alternative implementations, the functions noted in the blocks can occur out of the order noted in the Figures. For example, two blocks shown in succession can be executed substantially concurrently, and/or the blocks can sometimes be executed in the reverse order, depending upon the functionality involved. It will also be noted that each block of the block diagrams and/or flowchart illustration, and/or combinations of blocks in the block diagrams and/or flowchart illustration, can be implemented by special purpose hardware-based systems that can perform the specified functions and/or acts and/or carry out one or more combinations of special purpose hardware and/or computer instructions.

While the subject matter has been described above in the general context of computer-executable instructions of a computer program product that runs on a computer and/or computers, those skilled in the art will recognize that the one or more embodiments herein also can be implemented at least partially in parallel with one or more other program modules. Generally, program modules include routines, programs, components and/or data structures that perform particular tasks and/or implement particular abstract data types. Moreover, the aforedescribed computer-implemented methods can be practiced with other computer system configurations, including single-processor and/or multiprocessor computer systems, mini-computing devices, mainframe computers, as well as computers, hand-held computing devices (e.g., PDA, phone), and/or microprocessor-based or programmable consumer and/or industrial electronics. The illustrated aspects can also be practiced in distributed computing environments in which tasks are performed by remote processing devices that are linked through a communications network. However, one or more, if not all aspects of the one or more embodiments described herein can be practiced on stand-alone computers. In a distributed computing environment, program modules can be located in both local and remote memory storage devices.

As used in this application, the terms "component," "system," "platform" and/or "interface" can refer to and/or can include a computer-related entity or an entity related to an operational machine with one or more specific functionalities. The entities described herein can be either hardware, a combination of hardware and software, software, or software in execution. For example, a component can be, but is not limited to being, a process running on a processor, a processor, an object, an executable, a thread of execution, a program and/or a computer. By way of illustration, both an application running on a server and the server can be a component. One or more components can reside within a process and/or thread of execution and a component can be localized on one computer and/or distributed between two or more computers. In another example, respective components can execute from various computer readable media having various data structures stored thereon. The components can communicate via local and/or remote processes such as in accordance with a signal having one or more data packets (e.g., data from one component interacting with another component in a local system, distributed system and/or across a network such as the Internet with other systems via the signal). As another example, a component can be an apparatus with specific functionality provided by mechanical parts operated by electric or electronic circuitry, which is operated by a software and/or firmware application executed by a processor. In such a case, the processor can be internal and/or external to the apparatus and can execute at least a part of the software and/or firmware application. As yet another example, a component can be an apparatus that provides specific functionality through electronic components without mechanical parts, where the electronic components can include a processor and/or other means to execute software and/or firmware that confers at least in part the functionality of the electronic components. In an aspect, a component can emulate an electronic component via a virtual machine, e.g., within a cloud computing system.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form. As used herein, the terms "example" and/or "exemplary" are utilized to mean serving as an example, instance, or illustration. For the avoidance of doubt, the subject matter described herein is not limited by such examples. In addition, any aspect or design described herein as an "example" and/or "exemplary" is not necessarily to be construed as preferred or advantageous over other aspects or designs, nor is it meant to preclude equivalent exemplary structures and techniques known to those of ordinary skill in the art.

As it is employed in the subject specification, the term "processor" can refer to substantially any computing processing unit and/or device comprising, but not limited to, single-core processors; single-processors with software multithread execution capability; multi-core processors; multi-core processors with software multithread execution capability; multi-core processors with hardware multithread technology; parallel platforms; and/or parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, and/or any combination thereof designed to perform the functions described herein. Further, processors can exploit nano-scale architectures such as, but not limited to, molecular and quantum-dot based transistors, switches and/or gates, in order to optimize space usage and/or to enhance performance of related equipment. A processor can be implemented as a combination of computing processing units.

Herein, terms such as "store," "storage," "data store," data storage," "database," and substantially any other information storage component relevant to operation and functionality of a component are utilized to refer to "memory components," entities embodied in a "memory," or components comprising a memory. Memory and/or memory components described herein can be either volatile memory or nonvolatile memory or can include both volatile and nonvolatile memory. By way of illustration, and not limitation, nonvolatile memory can include read only memory (ROM), programmable ROM (PROM), electrically programmable ROM (EPROM), electrically erasable ROM (EEPROM), flash memory and/or nonvolatile random-access memory (RAM) (e.g., ferroelectric RAM (FeRAM). Volatile memory can include RAM, which can act as external cache memory, for example. By way of illustration and not limitation, RAM can be available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SL-DRAM), direct Rambus RAM (DRRAM), direct Rambus dynamic RAM (DRDRAM) and/or Rambus dynamic RAM (RDRAM). Additionally, the described memory components of systems and/or computer-implemented methods herein are intended to include, without being limited to including, these and/or any other suitable types of memory.

What has been described above includes mere examples of systems and computer-implemented methods. It is, of course, not possible to describe every conceivable combination of components and/or computer-implemented methods for purposes of describing the one or more embodiments, but one of ordinary skill in the art can recognize that many further combinations and/or permutations of the one or more embodiments are possible. Furthermore, to the extent that the terms "includes," "has," "possesses," and the like are used in the detailed description, claims, appendices and/or drawings such terms are intended to be inclusive in a manner similar to the term "comprising" as "comprising" is interpreted when employed as a transitional word in a claim.

The descriptions of the various embodiments have been presented for purposes of illustration but are not intended to be exhaustive or limited to the embodiments described herein. Many modifications and variations will be apparent to those of ordinary skill in the art without departing from the scope and spirit of the described embodiments. The terminology used herein was chosen to best explain the principles of the embodiments, the practical application and/or technical improvement over technologies found in the marketplace, and/or to enable others of ordinary skill in the art to understand the embodiments described herein.

What is claimed is:

1. A system, comprising:
   a memory that stores computer-executable components; and
   a processor that executes at least one of the computer-executable components that:
      receives a query submitted by a user;
      extracts information from at least one online source, according to the query and a defined geographic location associated with the user, wherein the information comprises a set of candidate knowledge sentences resulting from the query and the defined geographic location;
      generates respective triplets associated with the candidate knowledge sentences, wherein each triplet comprises a subject, a predicate, and an object extracted from the associated candidate knowledge sentence using a defined algorithm;
      generates a graph based on the respective triplets associated with the candidate knowledge sentences, wherein the subjects and the objects are represented by respective nodes of the graph, and the predicates are represented by respective edges between the nodes;

generates a first prompt based on inserting the candidate knowledge sentences and the query into a prompt template, wherein the first prompt restricts a large language model (LLM) to using the set of candidate knowledge sentences for responses to the query;

generates, by submitting the first prompt to the LLM, a first response for responding to the query generated by the LLM using the set of candidate knowledge sentences;

generates a triplet associated with the first response using the defined algorithm;

generates a subgraph by searching the graph using the triplet associated with the first response;

converts the subgraph into a set of triplets based on the nodes and the edges of the subgraph;

generates a second prompt based on inserting the query and the set of triplets into the prompt template, wherein the second prompt enforces responses of the LLM to the query to be based on the set of triplets;

generates, by submitting the second prompt to the LLM, a second response for responding to the query generated by the LLM using the set of triplets;

generates a final response for responding to the query, wherein generating the final response comprises:

constraining, using a Conditional Random Field (CRF) model trained using a knowledge database comprising candidate documents that are local to the defined geographic location, the second response generated by the LLM according to a state transition matrix of the CRF model to output the final response; and responds to the query using the final response.

2. The system of claim 1, wherein the extracting uses Simple Contrastive Learning of Sentence Embeddings (SimCSE), tagging, and semantic searching to extract the information from the at least one online source.

3. The system of claim 1, wherein the defined algorithm employs natural language processing.

4. The system of claim 1, wherein extracting the information comprises extracting the information according to the query, the defined geographic location, and an intention of the query inferred based on historical queries.

5. The system of claim 1, wherein the at least one of the computer-executable components further:

constructs, using second responses to queries generated by the LLM over time from second prompts, a first level knowledge graph that the LLM uses to respond to subsequent queries.

6. The system of claim 5, wherein the first level knowledge graph increases inference efficiency of the LLM above a defined threshold.

7. The system of claim 1, wherein extracting the information comprises extracting the information according to the query, the defined geographic location, and an intention of the query inferred based on a use case of a software application employed by the user in conjunction with submission of the query.

8. A computer-implemented method, comprising:

receiving, by a system operatively coupled to a processor, a query submitted by a user;

extracting, by the system, information from at least one online source, according to the query and a defined geographic location associated with the user, wherein the information comprises a set of candidate knowledge sentences resulting from the query and the defined geographic location;

generating, by the system, respective triplets associated with the candidate knowledge sentences, wherein each triplet comprises a subject, a predicate, and an object extracted from the associated candidate knowledge sentence using a defined algorithm;

generating, by the system, a graph based on the respective triplets associated with the candidate knowledge sentences, wherein the subjects and the objects are represented by respective nodes of the graph, and the predicates are represented by respective edges between the nodes;

generating, by the system, a first prompt based on inserting the candidate knowledge sentences and the query into a prompt template, wherein the first prompt restricts a large language model (LLM) to using the set of candidate knowledge sentences for responses to the query;

generating, by the system, by submitting the first prompt to the LLM, a first response for responding to the query generated by the LLM using the set of candidate knowledge sentences;

generating, by the system, a triplet associated with the first response using the defined algorithm;

generating, by the system, a subgraph by searching the graph using the triplet associated with the first response;

converting the subgraph into a set of triplets based on the nodes and the edges of the subgraph;

generating, by the system, a second prompt based on inserting the query and the set of triplets into the prompt template, wherein the second prompt enforces responses of the LLM to the query to be based on the set of triplets;

generating, by the system, by submitting the second prompt to the LLM, a second response for responding to the query generated by the LLM using the set of triplets;

generating, by the system, a final response for responding to the query, wherein generating the final response comprises:

constraining, using a Conditional Random Field (CRF) model trained using a knowledge database comprising candidate documents that are local to the defined geographic location, the second response generated by the LLM according to a state transition matrix of the CRF model to output the final response; and responding, by the system, to the query using the final response.

9. The computer-implemented method of claim 8, wherein the extracting comprises:

using, by the system, SimCSE, tagging, and semantic searching to extract the information from the at least one online source.

10. The computer-implemented method of claim 8, wherein the defined algorithm employs natural language processing.

11. The computer-implemented method of claim 8, wherein extracting the information comprises extracting the information according to the query, the defined geographic location, and an inferred intention of the query based on historical queries.

12. The computer-implemented method of claim 8, further comprising:

constructing, by the system, using second responses to queries generated by the LLM over time from second prompts, a first level knowledge graph that the LLM uses to respond to subsequent queries.

13. The computer-implemented method of claim 12, wherein the first level knowledge graph increases inference efficiency of the LLM above a defined threshold.

14. The computer-implemented method of claim 8, wherein extracting the information comprises extracting the information according to the query, the defined geographic location, and an intention of the query inferred based on a use case of a software application employed by the user in conjunction with submission of the query.

15. A computer program product for using in-context learning for large language models (LLMs), the computer program product comprising a computer readable storage medium having program instructions embodied therewith, the program instructions executable by a processor to cause the processor to:

receive, by the processor, a query submitted by a user;

extract, by the processor, information from at least one online source, according to the query and a defined geographic location associated with the user, wherein the information comprises a set of candidate knowledge sentences resulting from the query and the defined geographic location;

generate, by the processor, respective triplets associated with the candidate knowledge sentences, wherein each triplet comprises a subject, a predicate, and an object extracted from the associated candidate knowledge sentence using a defined algorithm;

generate, by the processor, a graph based on the respective triplets associated with the candidate knowledge sentences, wherein the subjects and the objects are represented by respective nodes of the graph, and the predicates are represented by respective edges between the nodes;

generate, by the processor, a first prompt based on inserting the candidate knowledge sentences and the query into a prompt template, wherein the first prompt restricts an LLM to using the set of candidate knowledge sentences for responses to the query;

generate, by the processor, by submitting the first prompt to the LLM, a first response for responding to the query generated by the LLM using the set of candidate knowledge sentences;

generate, by the processor, a triplet associated with the first response using the defined algorithm;

generate, by the processor, a subgraph by searching the graph using the triplet associated with the first response;

convert, by the processor, the subgraph into a set of triplets based on the nodes and the edges of the subgraph;

generate, by the processor, a second prompt based on inserting the query and the set of triplets into the prompt template, wherein the second prompt enforces responses of the LLM to the query to be based on the set of triplets;

generate, by the processor, by submitting the second prompt to the LLM, a second response for responding to the query generated by the LLM using the set of triplets;

generate, by the processor, a final response for responding to the query, wherein generating the final response comprises:

constraining, using a Conditional Random Field (CRF) model trained using a knowledge database comprising candidate documents that are local to the defined geographic location, the second response generated by the LLM according to a state transition matrix of the CRF model to output the final response; and respond, by the processor, to the query using the final response.

16. The computer program product of claim 15, wherein the program instructions are further executable by the processor to cause the processor to:

use, by the processor, SimCSE, tagging, and semantic searching to extract the information from the at least one online source.

17. The computer program product of claim 15, wherein extracting the information comprises extracting the information according to the query, the defined geographic location, and an inferred intention of the query based on historical queries.

18. The computer program product of claim 17, wherein the defined algorithm employs natural language processing.

19. The computer program product of claim 15, wherein the program instructions are further executable by the processor to cause the processor to:

use, by the processor, the responses generated by the LLM over time to build a first level knowledge graph that the LLM uses to respond to subsequent queries.

20. The computer program product of claim 15, wherein extracting the information comprises extracting the information according to the query, the defined geographic location, and an intention of the query inferred based on a use case of a software application employed by the user in conjunction with submission of the query.

* * * * *